United States Patent
Colonna et al.

(10) Patent No.: US 12,348,979 B2
(45) Date of Patent: Jul. 1, 2025

(54) METHOD AND SYSTEM FOR CALCULATING ORIGIN-DESTINATION MATRICES EXPLOITING MOBILE COMMUNICATION NETWORK DATA

(71) Applicant: TELECOM ITALIA S.p.A., Milan (IT)

(72) Inventors: Massimo Colonna, Turin (IT); Piero Lovisolo, Turin (IT); Dario Parata, Turin (IT); Massimiliano Petra, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 408 days.

(21) Appl. No.: 17/999,608

(22) PCT Filed: May 18, 2021

(86) PCT No.: PCT/EP2021/063170
§ 371 (c)(1),
(2) Date: Nov. 22, 2022

(87) PCT Pub. No.: WO2021/239521
PCT Pub. Date: Dec. 2, 2021

(65) Prior Publication Data
US 2023/0199513 A1    Jun. 22, 2023

(30) Foreign Application Priority Data
May 28, 2020   (IT) .................. 102020000012748

(51) Int. Cl.
*H04W 16/18*   (2009.01)
*H04W 64/00*   (2009.01)

(52) U.S. Cl.
CPC ......... *H04W 16/18* (2013.01); *H04W 64/003* (2013.01)

(58) Field of Classification Search
CPC ........................... H04W 16/18; H04W 64/003
See application file for complete search history.

(56) References Cited

U.S. PATENT DOCUMENTS

| | | | |
|---|---|---|---|
| 8,989,053 B1 * | 3/2015 | Skaaksrud ............... | G05D 1/81 370/255 |
| 10,743,198 B1 * | 8/2020 | Park ........................ | G08G 1/08 |

(Continued)

OTHER PUBLICATIONS

International Search Report & Written Opinion issued Aug. 19, 2021 in PCT/EP2021/063170 filed on May 18, 2021, 17 pages.

*Primary Examiner* — Justin Y Lee
(74) *Attorney, Agent, or Firm* — Oblon, McClelland, Maier & Neustadt, L.L.P.

(57) ABSTRACT

Matrices of movement in a geographic area are computed. The method subdivides the geographic area into geographic zones. Each entry of a matrix includes an indication of movements from one geographic zone to another in the respective time slot. The geographic area of interest is subdivided into geographic area portions, and mobile communication terminals in the geographic area calculate and provide respective geographic position estimates to a data processing system. An overall number of geographic position estimates are distributed by assigning to each geographic area portion a respective number of geographic position estimates. Covered geographic portions are determined among said plurality of geographic area portions, and each one of the determined covered geographic area portions is assigned a respective weight. A correspondence map establishing a correspondence between the network cells and the geographic zones is generated, and the weights are used in computing the matrices.

8 Claims, 13 Drawing Sheets

(56) References Cited

U.S. PATENT DOCUMENTS

| | | | |
|---|---|---|---|
| 2006/0293046 A1 | 12/2006 | Smith | |
| 2009/0005070 A1* | 1/2009 | Forstall | H04L 61/4594 455/456.1 |
| 2012/0115475 A1 | 5/2012 | Miyake et al. | |
| 2012/0115476 A1* | 5/2012 | Shin | G06Q 10/06 455/435.1 |
| 2012/0115502 A1* | 5/2012 | Lin | G01S 19/252 455/456.1 |
| 2012/0115505 A1 | 5/2012 | Miyake et al. | |
| 2013/0179058 A1 | 7/2013 | Smith | |
| 2015/0304818 A1* | 10/2015 | Carlsson | H04W 4/029 455/456.1 |
| 2022/0408272 A1* | 12/2022 | Feng | H04W 24/08 |

* cited by examiner

|       | $z_1$      | $z_2$      | ⋮ | $z_j$      | ⋮ | $z_8$      | $z_9$      |
|-------|------------|------------|---|------------|---|------------|------------|
| $z_1$ | mod(1,1)   | mod(1,2)   | ⋮ | mod(1,j)   | ⋮ | mod(1,8)   | mod(1,9)   |
| $z_2$ | mod(2,1)   | mod(2,2)   | ⋮ | mod(2,j)   | ⋮ | mod(2,8)   | mod(2,9)   |
| ⋮     |            |            |   |            |   |            |            |
| ⋮     |            |            |   |            |   |            |            |
| $z_i$ | mod(i,1)   | mod(i,2)   | ⋮ | mod(i,j)   | ⋮ | mod(i,8)   | mod(i,9)   |
| ⋮     |            |            |   |            |   |            |            |
| ⋮     |            |            |   |            |   |            |            |
| $z_8$ | mod(8,1)   | mod(8,2)   | ⋮ | mod(8,j)   | ⋮ | mod(8,8)   | mod(8,9)   |
| $z_9$ | mod(9,1)   | mod(9,2)   | ⋮ | mod(9,j)   | ⋮ | mod(9,8)   | mod(9,9)   |

| UE_id | position (x, y) | timestamp |
|---|---|---|
| UE_Id$_1$ | pos$_1$ | ts$_1$ |

705 → UE_id
710 → position (x, y)
715 → timestamp
700 → (table)

FIG.7

METHOD AND SYSTEM FOR CALCULATING ORIGIN-DESTINATION MATRICES EXPLOITING MOBILE COMMUNICATION NETWORK DATA

BACKGROUND OF THE PRESENT DISCLOSURE

Field of the Present Disclosure

The present disclosure generally relates to the field of analysis of traffic flows of moving physical entities, more specifically to the management of empirical data collected for performing traffic analysis. In more detail, the solution according to the present invention relates to a method and a system for calculating Origin-Destination ("O-D") matrices by exploiting, as empirical data, data made available by (or derived from data made available by) a mobile communication network.

Overview of the Related Art

Traffic analysis is aimed at identifying and predicting variations in the flow (e.g., people flow, vehicular traffic flow) of physical entities (e.g., people, land vehicles) moving in a geographic region of interest (e.g., an urban area) and over a predetermined observation period (e.g., a 24 hours observation period).

A typical, but not limitative, example of traffic analysis is represented by the analysis of vehicular (cars, trucks, etc.) traffic flow over the routes of a geographic Region of Interest ("RoI" for short). Such analysis allows achieving a more efficient planning of the transportation infrastructure within the RoI and also it allows predicting how changes in the transportation infrastructure (such as for example closure of roads, changes in a sequencing of traffic lights, construction of new roads and new buildings) can impact on the vehicular traffic.

In the following and for the purposes of the present disclosure, for traffic analysis it is intended the analysis of the movements of physical entities through a geographic area. Such physical entities can be vehicles (e.g., cars, trucks, motorcycles, public transportation buses) and/or individuals.

Being based on statistical calculations, traffic analysis needs a large amount of empirical data to be collected in respect of the RoI and the selected observation time period, in order to provide accurate results. In order to perform the analysis of traffic, the collected empirical data are then usually arranged in a plurality of matrices, known in the art as Origin-Destination ("O-D") matrices. The O-D matrices are based upon a partitioning of both the RoI and the observation time period.

For partitioning the RoI, the geographic area is subdivided into a plurality of zones, each zone being defined according to several parameters such as, for example, authorities in charge of the administration of the zones (e.g., a municipality), typology of land lots in the RoI (such as open space, residential, agricultural, commercial or industrial lots) and physical barriers (e.g., rivers) that can hinder traffic (physical barriers can be used as zone boundaries). The size of the zones in which the RoI can be subdivided, and consequently the number of zones, is proportional to the level of detail requested for the traffic analysis (i.e., city districts level, city level, regional level, state level, etc.).

Similarly, the observation time period can be subdivided into one or more time slots, and each time slot may be defined according to known traffic trends, such as for example peak traffic hours corresponding to when most commuters travel to their workplace and/or travel back to home. The length (time duration) of the time slots (and thus their number) is proportional to the level of detail requested for the traffic analysis over the considered observation time period.

Each entry of a generic O-D matrix comprises the number of physical entities moving from a first zone (origin) to a second zone (destination) of the RoI. Each O-D matrix corresponds to one time slot out of the one or more time slots in which the considered observation time period can be subdivided. In order to obtain a reliable traffic analysis, sets of O-D matrices should be computed over a plurality of analogous observation time periods and should be combined so as to obtain O-D matrices with a higher statistical value. For example, empirical data regarding the movements of physical entities should be collected over a number of (consecutive or not) days (each corresponding to a different observation time period), and for each day a corresponding set of O-D matrices should be computed.

A typical method for collecting empirical data used to compute O-D matrices related to a specific RoI is based on submitting questionnaires to, or performing interviews with, inhabitants of the RoI, and/or to inhabitants of the neighboring areas, about their habits in relation to their movements, and/or by installing vehicle count stations along routes of the RoI for counting the number of vehicles moving along such routes. The Applicant has observed that this method has very high costs and it requires a long time for collecting a sufficient amount of empirical data. Due to this, O-D matrices used to perform traffic analysis are built seldom, possibly every several years, and as such, being based on relatively old, not up-to-date data they often are, or quickly become, obsolete.

In the art, several alternative solutions have been proposed for collecting empirical data used to compute O-D matrices.

For example, U.S. Pat. No. 5,402,117 discloses a method for collecting mobility data in which, via a cellular radio communication system, measured values are transmitted from vehicles to a computer. The measured values are chosen so that they can be used to determine O-D matrices without infringing upon the privacy of the users.

In the Chinese patent application No. 102013159 a number plate identification data-based area dynamic O-D data acquiring method is described. The dynamic O-D data is the dynamic origin and destination data, wherein O represents origin and D represents destination. The method comprises the steps of: dividing OD areas according to requirements, wherein the minimum time unit is 5 minutes; uniformly processing data of each intersection in the area every 15 minutes by a traffic control center; detecting number plate data; packing the number plate identification data; uploading the number plate identification data to the traffic control center; comparing a plate number with an identity (ID) number passing through the intersections; acquiring the time of each vehicle passing through each intersection; acquiring the number of each intersection in the path through which each vehicle passes from the 0 point to the D point by taking the plate number as a clue; sequencing the intersections according to time sequence and according to the number of the vehicles which pass through between the nodes calculating a dynamic OD data matrix.

WO 2007/031370 relates to a method for automatically acquiring traffic inquiry data, e.g. in the form of an O-D matrix, especially as input information for traffic control systems. The traffic inquiry data are collected by means of radio devices placed along the available routes.

Nowadays, mobile phones have reached a thorough diffusion among the population of many countries, and mobile phone owners almost always carry their mobile phone with them. Since mobile phones communicate with a plurality of base stations of the mobile communication (mobile phone) networks, and each base station operates over a predetermined geographic area (or network cell) which is known to the mobile phone network operator, mobile phones result to be optimal candidates as tracking devices for collecting data useful for performing traffic analysis.

In N. Caceres, J. Wideberg, and F. Benitez "Deriving origin destination data from a mobile phone network", Intelligent Transport Systems, IET, vol. 1, no. 1, pp. 15-26, 2007, a feasibility study is presented for demonstrating the possibility of deriving an O-D matrix exploiting data obtained from a GSM network and, in particular, the network cell in which the mobile phone (or mobile terminal) accomplishes its activities (phone calls, messaging) and the Location Area (an aggregate of network cells) in which the mobile terminal periodically perform the Location Update procedure (a procedure used to update the location of the mobile terminal in the mobile phone network). A simulator software tool simulates the behaviour of a group of mobile terminals on-board of vehicles moving along a route joining two towns.

A peculiar type of O-D matrix is the so-called 'commuting matrix' which accounts for home place/work place, and viceversa, movements.

In M. Nanni, R. Trasarti, B. Furletti, L. Gabrielli, P. Van Der Mede, J. De Bruijn, E. De Romph, G. Bruil, "Transportation planning based on GSM traces: a case study on Ivory Coast", Citizen in Sensor Networks, Second International Workshop, CitiSens 2013, Barcelona, Spain, Sep. 19, 2013, an analysis process that exploits mobile phone transaction (trajectory) data to infer a transport demand model for the territory under monitoring is disclosed. In particular, long-term analysis of individual call traces are performed to reconstruct systematic movements, and to infer an O-D matrix. The case study includes the exploitation of the inferred mobility demand model in the construction of a transport model that projects the demand onto the transportation network (obtained from open data), and thus allows an understanding of current and future infrastructure requirements of the country. Data (Call Detail Records or CDRs) collected in respect of five continuous months are analysed, which allow identifying the two locations in which the majority of phone calls take place (these two locations are tagged "home" and "work"), and then the systematic movements between such two locations. The O-D matrix is built exploiting these systematic movements and excludes all the possible remaining movements not caught by the algorithm. Each location is, as a matter of fact, a group of adjacent network cells (the cells where the phone activity takes place) and each network cell is described through the respective Voronoi polygon (Voronoi tessellation, described at http://en.wikipedia.org/wiki/Voronoi_diagram) built starting from the geographic coordinates of the trellis where the network cell apparatuses are installed.

WO 2014/012927 discloses a method for constructing commuting matrices starting from position information of each user, extracted from the mobile communication network. The method is based on a new temporal variation of association rules (TAR, Temporal Association Rules) combined with an optimization process that identifies the best parameters to approximate the original O-D matrix. The method uses CDRs coming from the mobile communication network which contain the information about the network cell in which the activity took place. Each network cell is then assigned to the same geographic areas on which the National Institute of Statistics calculates its own O-D matrices and, through a suitable algorithm, the areas tagged as "home" and "work" are identified.

In S. Isaacman et al., "Identifying Important Places in People's Lives from Cellular Network Data", Pervasive 2011, LNCS 6696, pp. 133-151, June 2011, techniques based on clustering and regression for analyzing anonymized cellular network data to identify generally important locations, and to discern semantically-meaningful locations such as home and work are disclosed. Starting with temporally sparse and spatially coarse location information, an algorithm to identify important locations is described. The algorithm was tested on arbitrary cellphone users, including those with low call rates. Further, after locating home and work, commute distance estimates are performed. In this method the CDRs of the mobile network users are exploited. The network cells present in the CDRs (to each cell the position of the trellis on which the cell apparatuses are installed is assigned) are clustered and each cluster of cells is assigned a relevance. The two more relevant clusters are tagged as "Home" and "Work", and a movement between such two locations is identified.

The methods discussed above do not identify all the movements of the users and, as such, the O-D matrices that they can build are just a subset of all the O-D matrices expressing the total traffic on the territory. In the following, methods are presented that build complete O-D matrices, taking into account all the movements of the user.

In F. Calabrese et al. "Estimating Origin-Destination Flows Using Mobile Phone Location Data", IEEE Pervasive, pp. 36-44, October-December 2011 (vol. 10 no. 4), a further method is proposed that envisages to analyze position variations of mobile devices in a respective mobile communication network in order to determine entries of O-D matrices. The method provides for using an ad-hoc geolocation system of the mobile devices, developed by AirSage (AirSage's Wireless Signal Extraction technology), which by triangulation determines the mobile devices' position (latitude and longitude) on the territory. For each mobile device, positions closer to each other are aggregated to form "virtual locations" whose coordinates are given by the center of mass of the set of aggregated positions, and the virtual locations are then assigned to "regions" of the O-D matrix. The method thus exploits a geolocation system internal to the mobile communication network that continuously estimates the positions of all the network users in order to determine movements and then building complete O-D matrices.

A similar method is disclosed in WO 2014/067668: starting from individual positions derived by the phone activity, for each user the method identifies a set of "average geographical locations" being an aggregate of positions geographically and temporally close to each other (e.g., positions within a circle) such that the user can be regarded as steady, not moving. Starting from these average geographical locations it is possible to identify the movements of each user and thus calculate the O-D matrices. The method is based on the assumption that the geographic position (latitude and longitude) of all the mobile terminals is known with continuity in time, by querying a Location Database. The position can be obtained exploiting the GPS of the mobile terminals or it can be the position of the BTS ("Access Point") to which the mobile terminal is connected (in this case, all the mobile terminals connected to a same BTS will have the same position). The positions are then associated with zones of the O-D matrix.

U.S. Pat. No. 8,532,648 proposes a method that comprises the steps of: receiving user IDs, cell IDs and time stamps associated with the cell IDs and the user IDs; requesting and receiving, from a cell ID database, geographical coordinates corresponding to the cell IDs; finding stations and times for each user ID based on, at least in part, the geographical coordinates and time stamps associated with each user ID; exchanging the stations with a place for each one of the stations; generating at least one OD sub-matrix associated with each user ID based on, at least in part, places and times of arrival and departure associated with these places; and merging the OD matrices into an OD matrix. The method transforms the identifier of the cell in which the user performed his/her phone activity in geographic coordinates (latitude and longitude) through a database external to the system. The method identifies different "trips" performed by every user, each trip having an origin and a destination (calculated from said geographic coordinates), and aggregates all the trips made by each user, then for each user an O-D matrix is calculated and the global O-D matrix is obtained by aggregating the O-D matrices of the users.

Summary of the Solution According to the Present Disclosure

In activities like urban planning and transport system management it is important to identify the movements, transfers that every individual makes on the territory, both customary transfers (like home-work transfers) and less frequent or even occasional transfers. This knowledge allows building accurate O-D that are useful in practical applications.

As discussed in the foregoing, previous works disclose methods for calculating O-D matrices. However, the known methods are source of gross errors and can cause increase of traffic burden in the mobile communication network, with a negative impact for the network operator business.

Associating to each individual (being a user of a mobile terminal operable with a mobile communication network) a geographic position on the basis of the identifier of the network cell to which the user's mobile terminal is attached and performs its phone activity (phone call, messaging etc.) can be a source of gross errors in the O-D matrices because it does not take into account the actual coverage area of the cell, which can be very large (especially in suburban and rural areas) and significantly jagged (especially in urban areas, due to the presence of buildings), so that a network cell may collect mobile communication traffic from areas much different from the regions of the Voronoi tessellation. On the other hand, the distribution of people (users) on the territory, especially at scales smaller than the coverage areas of the cells, is not uniform nor linked to the morphology of the mobile communication network and the location of each radio site.

Using a geolocation technique based on a triangulation of the received radio signals for identifying the positions of all the users in the RoI when the O-D matrices have to be calculated, if from one side allows identifying (compared to a geolocation based on the identifiers of the network cells) the zone of the RoI where the user is located when he/she (through his/her mobile terminal) performs the phone activity and thus the movements of the user between zones of the RoI, from the other side causes an increase of mobile network traffic (signalling traffic or payload, depending on the specific type of information exchanged between the network and the (mobile terminal of the) user, and on the way the information is exchanged), which negatively impacts on the mobile network and mobile terminals performance. This increased traffic burden is greater the larger the RoI, the number of users inside the RoI is high and the observation time period adopted for calculating the O-D matrices is long. All this negatively reflects on the business of the mobile network operator.

The Applicant believes that, in order to overcome these problems, it is necessary to define a new method for calculating O-D matrices that, in associating network cells to zones of the RoI, takes into account the actual location of the individuals, without negatively impacting on the mobile communication network performance.

The Applicant has devised a solution for calculating O-D matrices on a geographic area of interest and during an observation period that makes use of position estimates performed by (a selected set of) mobile terminals, operable in a mobile communication network, which are located within the area of interest (for example, a selected set of mobile terminals including a relatively small number of mobile terminals compared to all the mobile terminals located in the area of interest) and sent to a central apparatus (central data processing system or server). The position estimates performed and provided by the (selected) mobile terminals are processed (at the central server) to calculate weights of the network cells of the mobile communication network on the zones of a subdivision in zones of the area of interest. Such weights are indications of the probabilities that an individual which is a user of a mobile terminal located in an area covered by each network cell is also located in a specific zone among the zones in which the area of interest is subdivided.

Exploiting the calculated weights, data available at and obtained from the mobile communication network, generated when the mobile terminals interact with (the cells of) the mobile communication network during their normal activities (data used to derive movements of the users through the area of interest) are distributed through the zones in which the area of interest is subdivided, to obtain an accurate indication of the origin and destination zones of such movements.

The position estimates performed and provided by the mobile communication terminals can be obtained preliminarily to the construction of the O-D matrices and can be re-used more times in the construction of O-D matrices for an area of interest, for more observation time periods, thereby achieving an efficient use of mobile communication network resources and a reduction of computational burden.

By "data available at the mobile communication network" it is meant data indicating events of interaction between mobile phones of users located in the area of interest and the cells of the mobile communication network. Events of interaction useful for the purposes of the present disclosure include for example one or more among (the following list is not exhaustive and not limitative, and may for example change with the evolution of the mobile communications technologies):

interactions at the power-on and/or power-off of the mobile phones;
  interactions at location area update (either periodical, performed with a periodicity imposed by the mobile communication network, or non-periodical, carried out by a mobile communication device to inform the cellular network whenever it moves from one "Location Area" to the next; as known, a "Location Area" is a portion of a territory formed by a group of network cells);

interactions at the re-entrance of the mobile phone into a covered area, covered by the mobile communication network, from an area not covered by the network;

interactions at the switch of the mobile phone from a mobile network technology to another (e.g., from 2G to 3G or viceversa, etc.);

interactions at incoming/outgoing calls (namely, at placing an outgoing call, at answering an incoming call);

interactions at sending/receiving SMS and/or MMS;

interactions at Internet access (from a browser or any other app of the mobile phone).

According to an aspect of the present disclosure, a method, implemented by a data processing system, for computing Origin-Destination matrices indicative of movements, in a geographic area of interest, of physical entities being users of mobile communication terminals configured to be adapted to interact with a mobile communication network comprising a plurality of network cells covering said geographic area of interest, each Origin-Destination matrix being related to a respective time slot of an observation time period and comprising a plurality of entries.

The method comprises:

subdividing said geographic area of interest in a plurality of geographic zones, each entry of an Origin-Destination matrix to be computed containing an indication of a number of movements from one geographic zone to another geographic zone of said plurality of geographic zones in said respective time slot;

subdividing the geographic area of interest in a plurality of geographic area portions;

causing mobile communication terminals served by the mobile communication network and situated in the geographic area of interest to calculate respective geographic position estimates and provide the calculated geographic position estimates to the data processing system;

distributing an overall number of geographic position estimates, received from the mobile communication terminals, on said geographic area portions by assigning to each geographic area portion of said plurality of geographic area portions a respective number of geographic position estimates corresponding to geographic positions estimates falling within said geographic area portion;

for each of said plurality of network cells: determining, among said plurality of geographic area portions, covered geographic area portions falling within a coverage area of said network cell, and assigning to each one of the determined covered geographic area portions a respective weight which depends on said respective number of geographic position estimates compared to an overall number of geographic position estimates falling within all said determined covered geographic area portions;

generating a correspondence map establishing a correspondence between said network cells and said geographic zones, said generating the correspondence map comprising, for the considered network cell, calculating a cell weight of the network cell on each geographic zone of said plurality of geographic zones by determining the covered geographic area portions belonging to each of said zones and summing the respective weights of the covered geographic area portions identified as belonging to said each of said geographic zones;

receiving from the mobile communication network and storing in a repository indications of events of interaction between the mobile communication terminals and the network cells of the mobile communication network, each indication of events of interaction including an indication of the network cell in which the event of interaction occurred and a time indication of the occurred event of interaction;

for each of said mobile communication terminals:

extracting from the repository and analysing the respective indications of events of interaction stored in the repository;

for selected couples of indications of events of interactions consecutive in time, extracted from the repository identifying the respective network cells in which the two events of interaction occurred, wherein the network cell in which the first in time event of interaction of the said couple of indications of events of interactions occurred is considered as origin network cell of a movement and the network cell in which the second in time event of interaction of said couple of indications of events of interactions is considered as destination network cell of a movement, wherein said identifying the respective network cells is based on said indication of the network cell in which the event of interaction occurred included in the indication of events of interaction stored in the repository;

identifying as origin geographic zones of said plurality of geographic zones where the mobile communication terminal was located when the first in time event of interaction of the couple occurred those geographic zones in respect of which the cell weight of the network cell associated with the first in time event of interaction of said couple is greater than a predetermined minimum weight;

identifying as destination geographic zones of said plurality of geographic zones where the mobile communication terminal was located when the second in time event of interaction of the couple occurred those geographic zones in respect of which the cell weight of the network cell associated with the second in time event of interaction of said couple is greater than a predetermined minimum weight, assigning to each movement from one of the identified origin geographic zones to one of the identified destination geographic zones a respective movement weight calculated as the product of the weight as a function of the weight of the origin network cell on said origin geographic zone and of the weight of the destination network cell on said destination geographic zone;

assigning to the entry of the Origin-Destination matrix corresponding to said one of the origin geographic zones and said one of the destination geographic zones a value determined on the basis of said movement weight, and providing said Origin-Destination matrices in output from said data processing system for the use, by a user of the data processing system, for estimating movements, in a geographic area of interest, of physical entities.

In embodiments, said indications of events of interaction between the mobile communication terminals and the network cells of the mobile communication network includes indications about one or more among:

interactions at the power-on and/or power-off of the mobile communication terminals;

interactions at location area updates;

interactions at the re-entrance of the mobile communication terminals into an area covered by the mobile communication network from an area not covered by the mobile communication network;

interactions at the switch of the mobile communication terminal from a mobile network technology to another;

interactions at incoming/outgoing phone calls;

interactions at sending/receiving SMS and/or MMS;

interactions at Internet access.

In embodiments, said causing mobile communication terminals served by the mobile communication network and situated in the geographic area of interest to calculate respective geographic position estimates and provide the calculated geographic position estimates to the data processing system comprises selecting, among all the mobile communication terminals served by the mobile communication network and situated in the geographic area of interest, a subset of selected mobile communication terminals according to a selection criterion comprising at least one among:

mobile communication terminals of users which have given their consent to activate their geographic localization;

mobile communication terminals of users which have given their consent to take part to measurement campaigns to be performed for purpose of calculating presences of individuals on a geographic territory;

mobile communication terminals of users who, at subscription, have declared a residence in a certain area inside the geographic area of interest;

mobile communication terminals of users in respect of whom the operator of the mobile communication network has determined a residence or a working location in a certain area inside the geographic area of interest.

In embodiments, the method may comprise configuring the subset of selected mobile communication terminals, said configuring comprising providing to the selected mobile communication terminals at least one among:

an indication of a time interval during which the selected mobile communication terminals will have to calculate the respective geographic position estimates;

an indication of a periodicity with which the selected mobile communication terminals will have to calculate the respective geographic position estimates;

an indication of whether the selected mobile communication terminals will have to provide to the data processing system the respective calculated geographic position estimates immediately after the respective geographic position estimates have been calculated or the respective calculated geographic position estimates can be provided to the data processing system at a later time after they have been calculated.

In embodiments, determining covered geographic area portions of said plurality of geographic area portions falling within a coverage area of said network cell may comprise:

obtaining a coverage area of said network cell;

determining which of said plurality of geographic area portions belong to the coverage area of said network cell, wherein said determining comprises at least one among:

assessing which of said plurality of geographic area portions have geographic coordinates of a center of gravity thereof falling inside the coverage area of said network cell;

assessing which of said plurality of geographic area portions fall, for a given percentage of their area, inside the coverage area of the network cell.

In embodiments, determining the covered geographic area portions belonging to each of said zones may comprise one among:

assessing which of said geographic area portions have geographic coordinates of a center of gravity thereof falling inside the zone;

assessing which of said geographic area portions fall, for a given percentage of their area, inside the zone.

In embodiments, distributing an overall number of geographic position estimates received from the mobile communication terminals on said geographic area portions and said generating a correspondence map are performed for each time slot of said observation time period, whereby said cell weight of the network cell provides an indication of a probability that a user of a mobile communication terminal that is located in the coverage area of the network cell is, in the considered time slot, located in a specific zone of said plurality of zones.

According to another aspect of the present disclosure, a data processing system comprising modules configured to perform, when operated, the method of the previous aspect.

BRIEF DESCRIPTION OF THE ANNEXED DRAWINGS

These and other features and advantages of the solution according to the present disclosure will be better understood by reading the following detailed description of an embodiment thereof, provided merely by way of non-limitative example, to be read in conjunction with the attached drawings, wherein:

FIG. 1 schematically shows a system, according to an embodiment of the present disclosure, for computing O-D matrices on a territory;

FIG. 2 schematically shows a module of the system of FIG. 1 (in the following referred to as "Localization Manager");

FIG. 4 depicts an O-D matrix generated by the system of FIG. 1, being a matrix which in a generic matrix entry (i,j) contains the number of movements or transfers from the i-th zone of the RoI, indicated by the i-th O-D matrix row to which the entry (i,j) belongs, to the j-th zone of the RoI, indicated by the j-th O-D matrix column to which the entry (i,j) belongs;

FIG. 5 shows a set of M O-D matrices calculated in respect of M time slots into which an observation time period TP of the RoI is subdivided;

FIG. 7 shows position estimates (measurements) sent by mobile terminals (in the following also referred to as "User Equipment" or concisely "UE") to the Localization Manager and containing estimates of the UE positions made by the UE, along with the corresponding timestamp;

DETAILED DESCRIPTION OF EXEMPLARY EMBODIMENTS OF THE PRESENT DISCLOSURE

Figure 1:
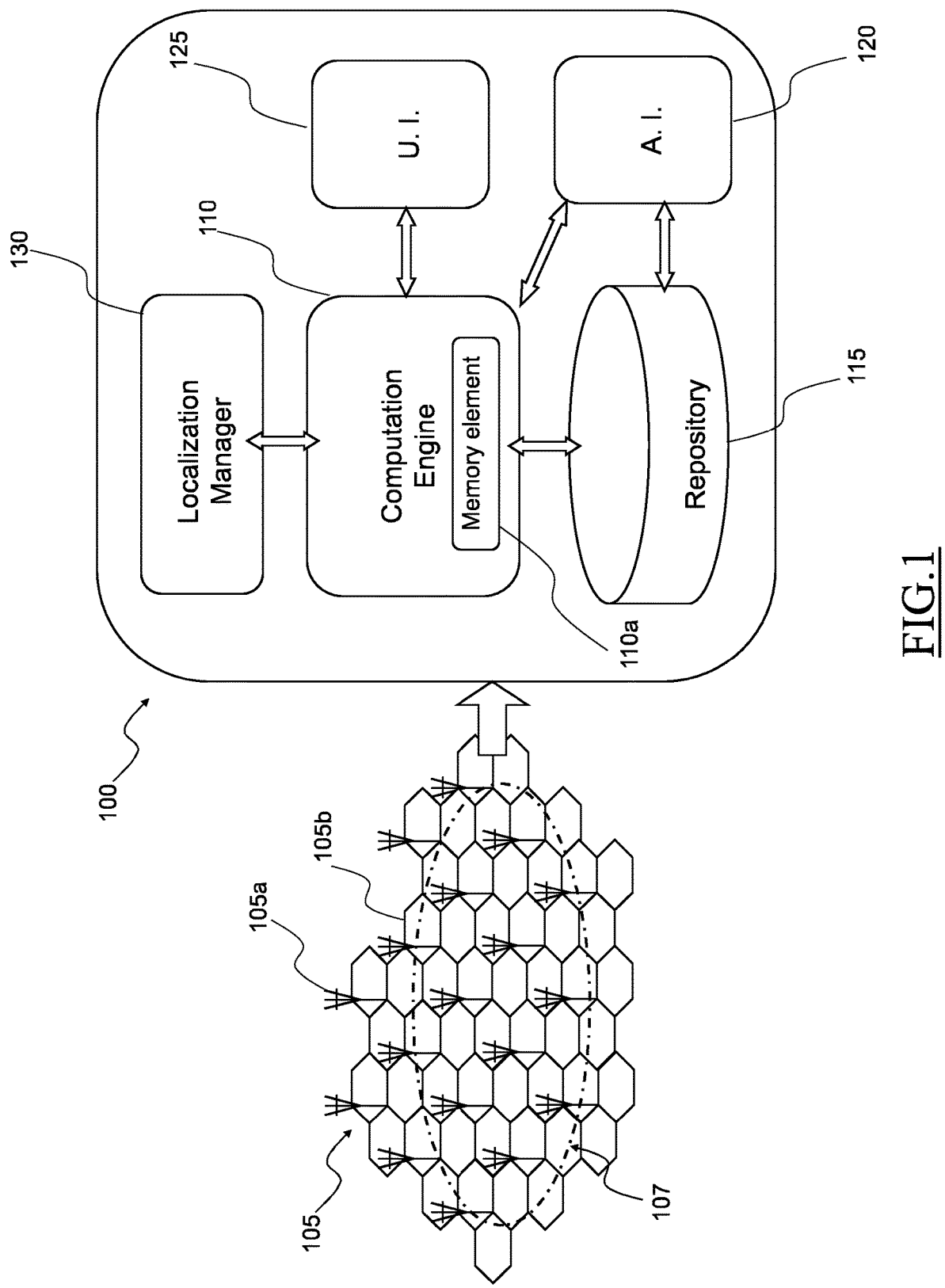

With reference to the drawings, FIG. 1 is a schematic representation of a system 100 for the computation of O-D matrices, simply referred to as system 100 hereinafter, according to an exemplary embodiment of the present disclosure.

The system 100 is coupled with a mobile communication network 105, such as a (2G, 3G, 4G, 5G or higher/other generation) mobile telephony network, and is configured for receiving from the mobile communication network 105 positioning (geolocation) data of each UE (e.g., mobile phones, smartphones, tablet with 2G-3G-4G-5G or higher/other connectivity, etc.) of individuals located in a surveyed geographic area 107, schematized in FIG. 1 as the area within the dash-and-dot line (e.g., a city, a municipality, a district, etc.).

The mobile communication network 105 comprises a plurality of (two or more) communication stations 105a (e.g., radio base stations of the mobile telephony network) geographically distributed in the surveyed area 107. Each communication station 105a is adapted to manage communications of UE (not shown, such as for example mobile phones) in one or more served areas or network cells 105b (in the example at issue, three cells are served by each communication station 105a) as will be discussed in greater detail below.

Even more generally, each communication station 105a of the mobile communication network 105 is adapted to interact with any UE located within one of the cells 105b served by such communication station 105a (e.g., interactions at UE power on/off, at location area update, at incoming/outgoing phone calls, at sending/receiving messages, like SMS and/or MIMS, at Internet access etc.). Such interactions between the UE and the mobile communication network 105 will be generally denoted as events $e_v$ (v=1, ..., V; V>0) in the following.

The surveyed geographic area 107 may be regarded as subdivided in a plurality of sectors, each one corresponding to a respective cell 105b of the (part of the) mobile communication network 105 superimposed on the surveyed area 107.

The system 100 comprises a Computation Engine 110 configured to be adapted to process data retrieved from the mobile communication network 105, and a Repository 115 (such as a database, a file system, etc.) configured to be adapted to store data regarding interactions between the UE and the mobile communication network 105. The Repository can also be used to store computation results generated by the Computation Engine 110 and, possibly, any processing data generated by and/or provided to the system 100 (generally in a binary format).

The data stored in the Repository 115 include data about the coverage area (coverage area data) of the cells 105b of the mobile communication network 105. For the purposes of the present disclosure, the way in which the coverage area data are expressed is not relevant: the coverage area of a cell can indifferently be expressed by way of the geographic coordinates of the center and the radius of a circle defining the cell coverage area or by way of areas delimited by polygons, regular or irregular, with any number of sides, or by way of the union of square pixels, joint or separated. Additionally, the present disclosure does not depend on the way adopted for the computation of the cells' coverage area, so that it is possible to exploit, indifferently, both simplified electromagnetic field propagation models (such as those described in Theodore S. Rappaport, "Wireless Communications", Prentice Hall, 1996, Chapter 3 and Chapter 4, pages 69-196) and mobile network planning tools normally exploited by mobile communication network operators. Moreover, the coverage of the network cells can indifferently be calculated specifically, ad-hoc for the system 100 before the start of the operation of the system 100, or be coverage area data already available to the operator of the mobile communication network 105 for the network planning.

The system 100 is provided with an Administrator Interface (A.I.) 120 (e.g., implemented in a computer) configured and operable for modifying parameters and/or algorithms used by the computation engine 110 and/or accessing data stored in the repository 115.

The system 100 may comprise one or more User Interfaces (U.I.) 125 (e.g., a user terminal, or a software running on a remote terminal connected to the system 100) adapted to receive inputs from, and to provide output to a user of the system 100. In the present disclosure the expression "user of the system" may refer to one or more human beings and/or to external computing systems (such as a computer network, not shown) of a third party being subscriber of the services provided by the system 100 and enabled to access the system 100—e.g., under subscription of a contract with a service provider owner of the system 100, and possibly with reduced right of access to the system 100 compared to the right of access held by an administrator of the system 100 operating through the Administrator Interface 120.

Figure 2:
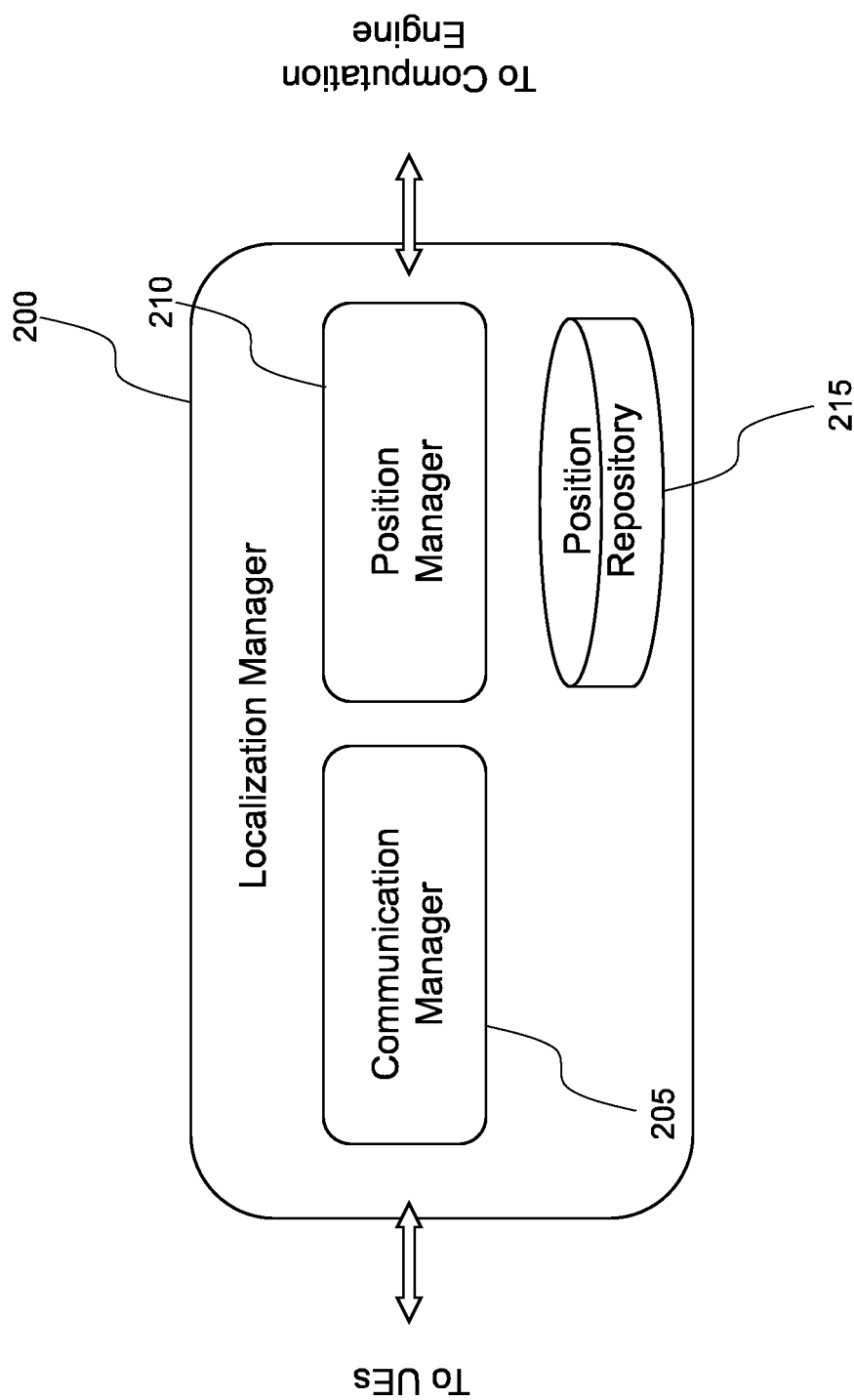

The system 100 comprises a Localization Manager 130, shown in greater detail as 200 in FIG. 2, from a logical viewpoint. The Localization Manager 200 comprises a Communication Manager 205 and a Position Manager 210. The Communication Manager 205 is configured to be adapted to manage the communications with the UE (possibly, with a selected subset of all the UE) that happen to be located in the surveyed area 107, particularly for transferring to the (selected) UE configuration parameters of the system (as described in detail later on). The Position Manager 210 is configured to receive position estimates, with related timestamps, calculated and sent by the UE, and to transfer the received position estimates and timestamps, when needed, to the Computation Engine 110, for processing by an algorithm for the computation of O-D matrices.

The Localization Manager 200 can also include a Position Repository 215 (such as a database, a file system, etc.) in which the position estimates (and related timestamps) provided by the UE are stored. The Position Repository 215 can also be physically integrated in the Repository 115, if suitable (e.g., in case the Localization Manager 200 is physically integrated with the other components of the system 100 or when the transfer of data between the Localization Manager 200 and the Repository 115 can be accomplished quickly without causing delays on the processing operations).

The (Communication Manager 205 of the) Localization Manager 200 is configured to be adapted to communicate with the UE through the mobile communication network 105. However, for the purposes of the present disclosure the specific way in which the communication between the Localization Manager 200 and the UE is accomplished, and the protocols adopted therefore, are not limitative. The dialogue between the Localization Manager 200 and the UE can for example take place through the User-plane, e.g., using communication protocols of the Internet world (like the TCP/IP), in a way totally similar to what normally happens between a terminal and a remote server, or through the Control-plane, encapsulating the messages exchanged between the Localization Manager 200 and the UE in signaling messages that apparatuses of the mobile communication network 105 exchange for performing their specific operations.

The system 100 may be implemented in any known manner; for example, the system 100 may comprise a single computer, or a network of distributed computers, either of physical type (e.g., with one or more main machines implementing the computation engine 110 and the repository 115 connected to other machines implementing Administrator and User Interfaces 120 and 125) or of virtual type (e.g., by implementing one or more virtual machines in a network of computers).

Additionally, some modules and/or functionalities of the system 100, such as the Localization Manager 200, can be part of, implemented in, the mobile communication network 105 or possibly be implemented in some apparatuses of the mobile communication network 105 or in the O&M system thereof. The different functionalities of the Localization Manager 200 can be implemented in different apparatuses, depending on the specific necessities of the mobile communication network operator and/or administrator of the system 100 (costs, availability of apparatus, available communication bandwidth for the links, etc.). For the purposes of the present disclosure, these aspects of implementation detail are not strictly relevant.

The system 100 is configured to be adapted to retrieve (and/or receive) from the mobile communication network 105 an event record $er_v$ (v=1, ..., V; V being a positive integer) for each event $e_v$ (v=1, ..., V) occurred between a UE and the mobile communication network 105 (through one of its communication stations 105a) within the surveyed geographic area 107. Each event record $er_v$ retrieved by the system 100 from the mobile communication network 105 may comprise—in a non-limitative manner—an identifier of the UE that is involved in the corresponding event $e_v$ (e.g., the UE identifier may be selected as one or more among the International Mobile Equipment Identity—IMEI, the International Mobile Subscriber Identity—IMSI and the Mobile Subscriber ISDN Number—MSISDN code), time data (also denoted as timestamps) indicating the time at which the corresponding event $e_v$ has occurred, and an identifier of the cell 105b involved in such event $e_v$.

In one embodiment of the present invention, the UE identifier of the UE involved in the event record $er_v$ may be provided not in clear, i.e. as an encrypted information in order to ensure the privacy of the UE owner. In other words, if the need arises, the information (i.e., the identity of the owner of the UE corresponding to the UE identifier) may be encrypted/decrypted by implementing a suitable encryption/decryption algorithm, or a cryptographic hash function such as for example the algorithm SHA256 described in "Secure Hash Standard (SHS)", National Institute of Standards and Technology FIPS—180-4, Mar. 6, 2012. In this way, the identity of the individual is not in clear, being replaced by a non-intelligible pseudonym.

The system 100 may retrieve (and/or receive) the event records $er_v$ related to a generic UE from the mobile communication network 105 by acquiring records of data generated and used in the mobile communication network 105 for its own purposes. For example, in case the mobile communication network 105 is a GSM network, Charging Data Records (CDRs), also known as call data records, and/or Visitor Location Records (VLRs) may be retrieved from the mobile communication network 105 and reused as event records err. The CDR is a data record (usually used for billing purposes by a mobile telephony service provider operating through the mobile communication network 105) that contains attributes specific to a single instance of a phone call or other communication transaction performed between a UE and the mobile communication network 105. The VLRs are databases listing UE that have roamed into the jurisdiction of a Mobile Switching Center (MSC, not shown) of the mobile communication network 105, which is a management element of the mobile communication network 105 managing events over a plurality of communication stations 105a. Each communication station 105a in the mobile communication network 105 is usually associated with a respective VLR. If the mobile communication network 105 is an LTE network, records of data associated with the event records $er_v$ of a generic UE may be generated by a Mobility Management Entity, or MME, comprised in the mobile communication network 105, which is responsible for a UE tracking and paging procedure in LTE networks (where no VLR is implemented).

It should be noted that the method described in the present disclosure may be implemented by using any source of data (e.g., provided by one or more WiFi networks) from which it is possible to obtain event records $er_v$ comprising a univocal identifier of individuals (such as the UE identifier mentioned above), a position estimate of such individuals, and a time indication of an instant during which such event has occurred.

In operation, event records $er_v$ may be continuously retrieved by the system 100 from the mobile communication network 105. Alternatively, event records $er_v$ may be collected by the system 100 periodically, e.g. for a predetermined time period (e.g., every certain number of hours, or on a daily or weekly basis). For example, event records $er_v$ may be transferred from the mobile communication network 105 to the system 100 as they are generated, in a sort of "push" modality, or event records $er_v$ may be collected daily in the mobile communication network 105 and then packed and transferred to the system 100 periodically or upon request by the system 100.

The event records $er_v$ retrieved from the mobile communication network 105 are stored in the Repository 115, where they are made available to the Computation Engine 110 for processing. Event records $er_v$ generated by a same UE can be grouped together in the Repository 115, i.e. event records $er_v$ can be grouped together if they comprise a common UE identifier and can be denoted as event records group $erg_n$ (e.g., n=0, ..., N, N≥0) hereinafter.

The computation engine 110 is configured to be adapted to execute an algorithm (described in the following) for computing O-D matrices on a geographic area. The algorithm is implemented by a software program product stored in a Memory Element 110a of the system 100, comprised in the Computation Engine 110 in the example of FIG. 1, even though the software program product could be stored in the Repository 115 as well (or in any other memory element provided in the system 100).

The event records $er_v$ can be processed according to (as discussed in detail below) instructions provided by the system administrator (through the Administrator Interface 120), for example stored in the Repository 115, and, possibly, according to instructions provided by a user (through the User Interface 125).

The Computation Engine 110 provides the results of the processing performed on the event records $er_v$ to the user of the system 100 through the User Interface 125, and optionally stores such processing results in the Repository 115.

The system 100 may be adapted to retrieve (or receive) data about individuals not exclusively from a mobile telephony network 105. Alternatively or in addition, the system 100 may be configured to retrieve (or receive) data about individuals from one or more wireless computer networks, such as WLANs, operating in the surveyed area 107, provided that the UE of the individuals are capable to connect to such wireless computer networks and that the UE (at least a subset of all the UE located in the surveyed area 107) are capable of estimating their position by means of any geolocation technique (such as the GPS).

Figure 3:
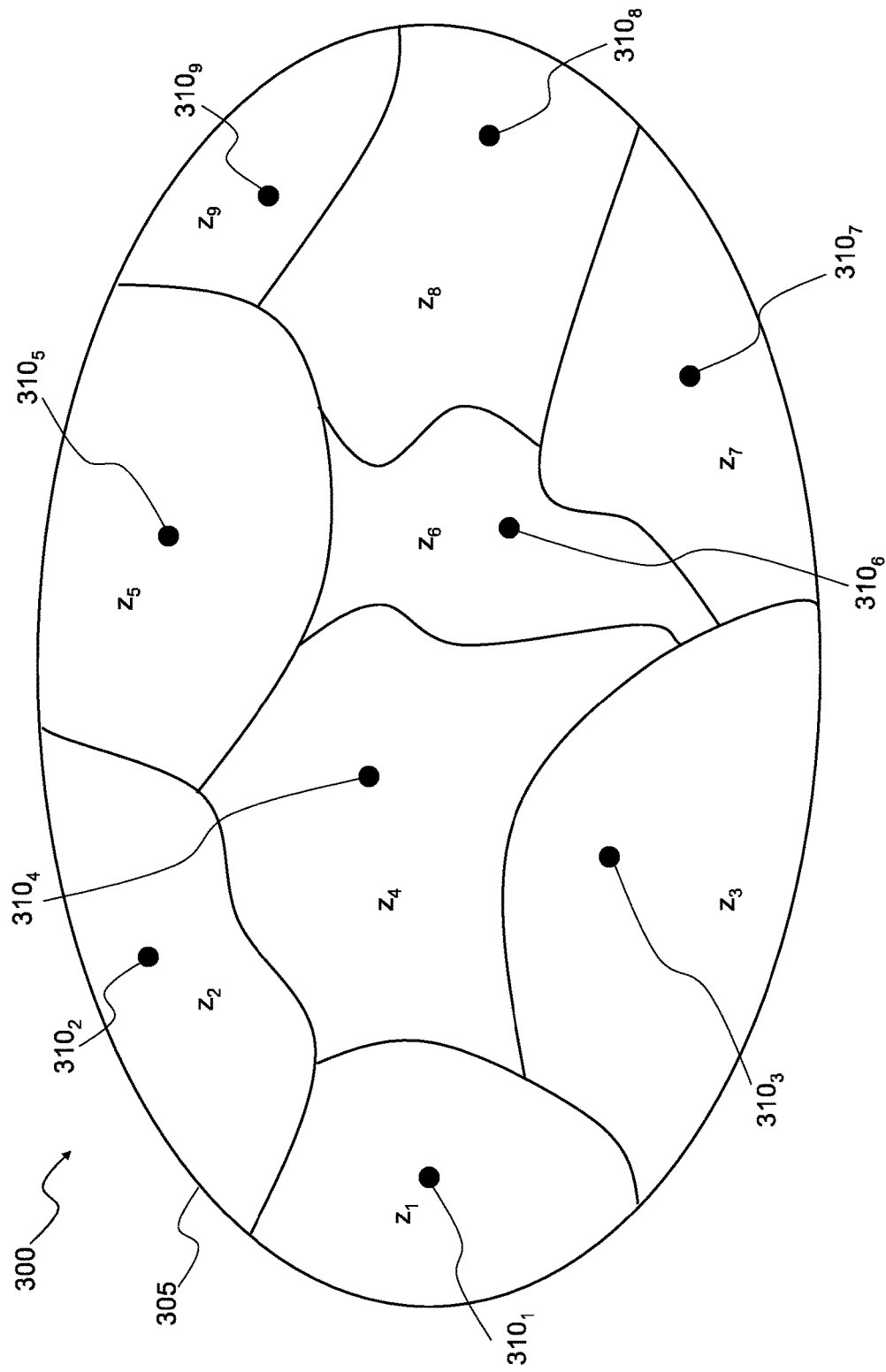
FIG. 3 is a schematic view of a surveyed geographic area (in the following referred to as "Region of Interest" or, concisely, "RoI")

FIG. 3 is a schematic view of the surveyed geographic area 107, in the following simply denoted as Region of Interest (RoI) and identified as 300, as the area within the ellipsis delimited by a boundary, or external cordon 305 (which is assumed to delimit the RoI 300). It is pointed out that the elliptical shape of the RoI 300 is merely exemplary and not limitative: any other shape is possible.

The RoI 300 is a geographic region within which the O-D matrices are to be calculated by the system 100. For example, the RoI 300 may be either a district, a town, a city, or any other kind of geographic area. Moreover, the RoI 300 may comprise a number of sub-regions including non-adjacent geographical locations, such as for example a plurality of different cities, different counties and/or different nations (and so on). In addition, the RoI 300 may comprise a set of one or more predetermined locations (such as for example airports, bus/train stations, etc.).

Let it be assumed, as non-limiting example, that a traffic analysis (e.g., an analysis of people flow) over the RoI 300 is performed in order to identify movements of people and for computing O-D matrices referred to the movements of people identified by the traffic analysis.

The RoI 300 is subdivided into a plurality of traffic analysis zones, or simply zones $z_q$ (q=1, . . . , Q; where Q is a positive integer) in which it is desired to analyze traffic flows. In the example shown in FIG. 3, the RoI 300 is subdivided into nine zones $z_1$, . . . , $z_9$ (i.e., Q=9).

Each zone $z_q$ may be determined by using a zoning technique. According to this zoning technique, each zone $z_q$ may be delimited by administrative (city limits, national boundaries, etc.) and/or physical boundaries (such as rivers, railroads etc.) within the RoI 300 that may hinder the traffic flow and may comprise adjacent lots of a same kind (such as open space, residential, agricultural, commercial or industrial lots) which are expected to experience similar traffic flows. The zones $z_q$ may differ in size from one another. Each zone $z_q$ is modeled as if all traffic flows starting or ending therein were concentrated in a respective single point or centroid $310_q$ (i.e., $310_1$, . . . , $310_9$) of that zone $z_q$. In other words, the centroid $310_q$ of the generic zone $z_q$ represents an ideal hub from which, or at which, any traffic flow starts or ends, respectively.

Anyway, it is pointed out that the solution according to embodiments of the present invention is independent from the criteria used to partition the RoI 300 into zones $z_q$.

FIG. 4 shows, schematically, an O-D matrix 400 associated with the RoI 300. The O-D matrix 400 is referred to a respective time interval or time slot ts of an observation time period TP, as described in greater detail in the following.

The generic O-D matrix 400 is typically a square matrix having Q rows i and Q columns j. Each row and each column of the O-D matrix 400 are associated with a corresponding zone $z_q$ of the RoI 300; thus, considering the RoI 300 in the example of FIG. 3, the corresponding O-D matrix 400 comprises nine rows i=1, . . . , 9 and nine columns j=1, . . . , 9.

Each row i of the O-D matrix 400 represents an origin zone $z_i$ for traffic flows of moving physical entities (for example land vehicles) while each column j of the O-D matrix 400 represents a destination zone $z_j$ for traffic flows of such moving physical entities. In other words, each generic element or entry mod(i,j) of the O-D matrix 400 contains an indication of the number of traffic flows starting in the zone $z_i$ (origin zone) and ending in the zone $z_1$ (destination zone) in the corresponding time slot ts.

The main diagonal of the O-D matrix 400, which comprises the entries mod(i,j) having i=j (i.e., entries mod(i,j) having the same zone $z_i$ both as origin and destination zone), is usually left empty (e.g., with values of the entries set to 0) or the values of the main diagonal entries mod(i,j) are discarded since they do not depict a movement between zones of the region of interest (i.e., such entries do not depict a flow of people).

As outlined above, in order to obtain a more detailed and reliable traffic analysis, a predetermined observation time period TP of the traffic flows in the region of interest is also established and it is subdivided into one or more (preferably a plurality) of time slots $ts_m$ (m=1, . . . , M, where M is a positive integer). Each time slot $ts_m$ ranges from an initial time instant $t_{0(m)}$ to a next time instant $t_{0(m+1)}$ (excluded) which is the initial time instant of the next time slot $ts_{m+1}$, or:

$$ts_m = [t_{0(m)}, t_{0(m+1)}).$$

Anyway, embodiments of the present invention featuring overlapping time slots are not excluded, as well as one (or more) missing time slot(s) during the predetermined observation time period TP. Also, the time slots $ts_m$ into which the observation tome period TP is subdivided may have different lengths (time duration) from one another. Additionally, the observation time period TP may include just one time slot $ts_m$ of length equal to the length of the time period TP.

Figure 5:
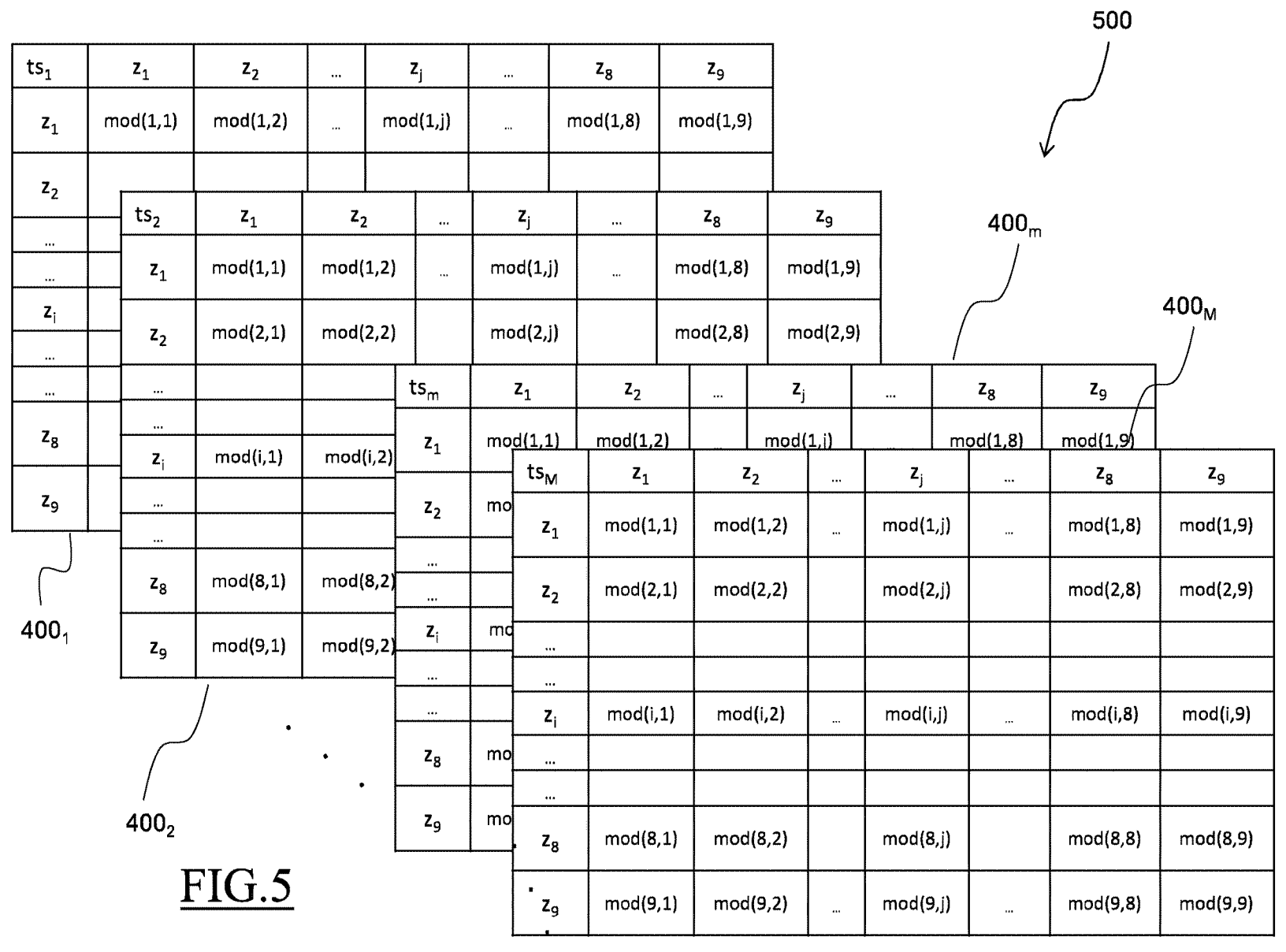

For each one of the time slots $ts_m$ a respective O-D matrix 400m is computed that accounts for the people movements that have taken place during the time slot $ts_m$. Therefore, a sequence or set of O-D matrices 500 of a number M of O-D matrices 400m, as shown in FIG. 5, is obtained that provides information on movements of people from/to each one of the different zones $z_q$ of the RoI 300 in the observation time period TP.

In one embodiment of the present disclosure, values to which the observation time period TP and the time slots $ts_m$ are set may correspond to 24 hours and 1 hour, respectively. Naturally, the scope of the present disclosure is not limited by any specific values selected for the observation time period TP and the time slots $ts_m$.

The procedure for computing the O-D matrices 400m is now described.

Figure 6:
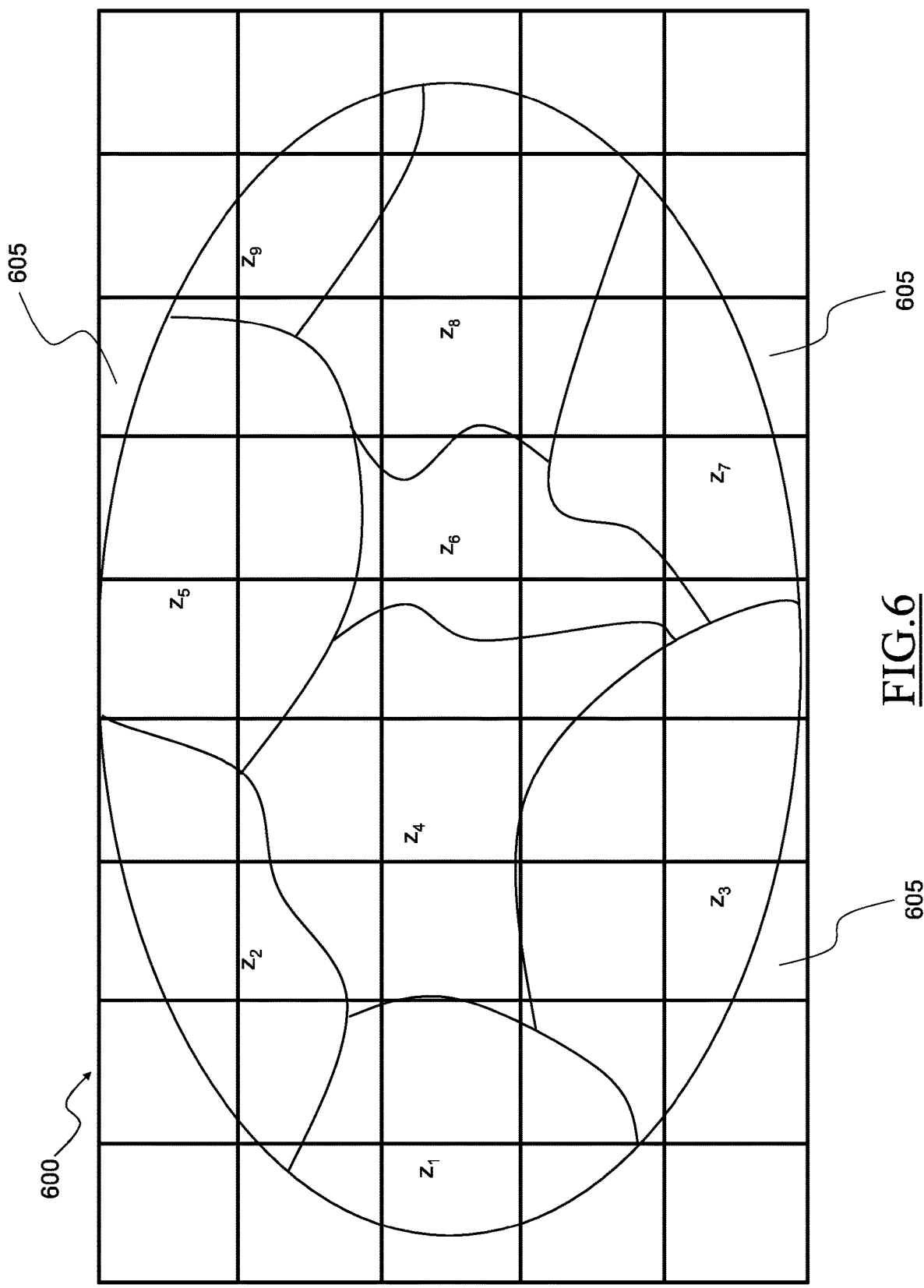
FIG. 6 depicts a tessellation of the RoI.

The ROI 300 on which the system 100 has to compute the O-D matrices 400m is completely tessellated by a tessellation 600, as shown in FIG. 6. For the sake of simplicity, a tessellation 600 with square tiles 605 all of equal size has been chosen, but for the purposes of the present disclosure, the shape of the tiles 605 of the tessellation 600 is irrelevant; for example, instead of square tiles, triangular or polygonal tiles can be used. The size of the tiles 605 is also not relevant.

The tessellation 600 of the RoI 300 is independent from the coverage of the RoI 300 by the network cells of the mobile communication network 105. The tessellation 600 is also independent from the partition on zones (number and size of the zones) of the RoI 300. In other words, there is no relationship between the tiles 605 and the network cells 105b, and between the tiles 605 and the zones $z_q$. The tessellation 600 is for example inputted by the administrator of the system 100 through the Administrator Interface 120.

For the purposes of the present disclosure, the system 100 requests to the UE (possibly, to a subset thereof) that happens to be located in the RoI 300 to provide a periodical estimation of their position. The UE may for example exploit the GPS localization resources integrated therein for calculating their position estimates. The position estimates (hereafter also referred to as "position measurements", since the position estimates are obtained by measuring one or more characteristics of radio signals received by the UE from the radio base stations, from GPS satellites or other GNSS, etc., depending on the localization technology adopted) are arranged as t-uples, e.g. triplets 700 of the type (UE_id, position (x,y), timestamp), depicted in FIG. 7, where:

the field UE_id 705 of the triplet 700 contains an indication of a univocal identifier of the UE that calculated and sent the position estimate. For the purposes of the present disclosure the value to be put in the field UE_id 705 may be selected among one or more among the International Mobile Equipment Identity—IMEI—, the International Mobile Subscriber Identity—IMSI—and the Mobile Subscriber ISDN Number—MSISDN—code;

the field position (x,y) 710 of the triplet 700 contains an indication of the geographic position (longitude and latitude) estimated by the UE, i.e., the value of the position estimate, expressed in any system of geographic coordinates (e.g., WGS84), and the field timestamp 715 of the triplet 700 contains the indication of the time instant at which the position estimate was calculated/determined by the UE.

The field UE_id 705 may also be absent. If present, this field allows optimizing some performances of the system 100, as described later on. In one embodiment of the present disclosure, the value in the field UE_id 705 may be provided not in clear, e.g. as an encrypted information in order to ensure the privacy of the UE owner. In other words, if the need arises, the information (i.e., the identity of an individual corresponding to the UE whose univocal identifier is specified in the field UE_id 705) may be encrypted/decrypted by implementing a suitable encryption/decryption algorithm, or a cryptographic hash function, such as for example the algorithm SHA256 described in "Secure Hash Standard (SHS)", National Institute of Standards and Technology FIPS—180-4, Mar. 6, 2012. In this way, the identity of the individual is not in clear, being replaced by a non-intelligible pseudonym.

The procedure implemented by the system 100 for computing the O-D matrices can be regarded as composed by two main phases, generically, but not necessarily, separated in time from each other.

In a first phase of the procedure, cells-zones correspondence maps are constructed. This first phase is based on a set of position estimates (measurements) performed by a set of UE within the RoI 300, exploiting any suitable geolocation technique available at the UE (e.g., the GPS). The measurement time period MP during which such position estimates are carried out is subdivided into time slots, for example the same time slots $ts_m$ used to subdivide the observation time period TP during which the set 500 of O-D matrices 400m is to be calculated on the RoI 300. For each time slot $ts_m$ of the measurement time period MP, a cells-zones correspondence map is calculated: thus, a number M of cells-zones correspondence maps are calculated.

In a second phase of the procedure, for each time slot $ts_m$ of the observation time period TP the movements between the zones $z_q$ into which the RoI 300 is subdivided are calculated, exploiting the cells-zones correspondence maps calculated in the same time slot $ts_m$ of the measurement time period MP. The set 500 of O-D matrices 400m is thus generated.

The term "map" used herein should be not be intended as referring to a common geographic map, rather the term shall be intended as a tool that associates one or more numerical values (obtained by processing data provided by the mobile communication network) to entities representing portions of the territory (like the tiles 605 of the tessellation 600 or the zones $z_q$ of the subdivision into zones 300).

Figure 8:
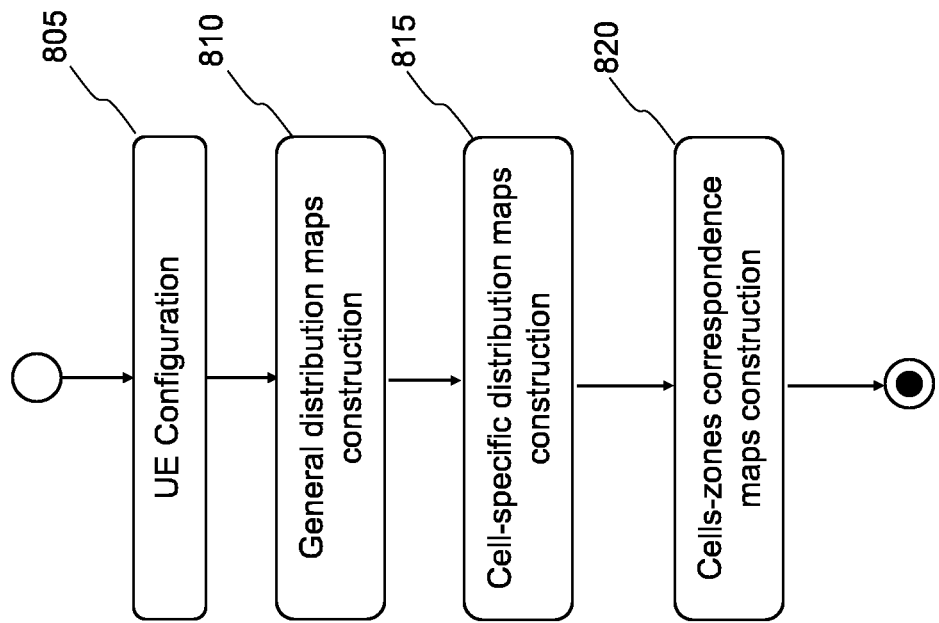
FIG. 8 shows a high-level flowchart of a procedure for constructing cells-zones correspondence maps.

Referring to FIG. 8, a procedure 800 according to an embodiment of the present disclosure for constructing cells-zones correspondence maps comprises four main steps:

step 805: configuration of those UE that will have to calculate and provide to the system 100 estimates of their position;

step 810: construction of general distribution maps (one general distribution map for each time slot $ts_m$);

step 815: construction of cell-specific distribution maps (one cell-specific distribution map for each cell, for each time slot $ts_m$), and step 820: construction of cells-zones correspondence maps (one map for each time slot $ts_m$).

Figure 9:
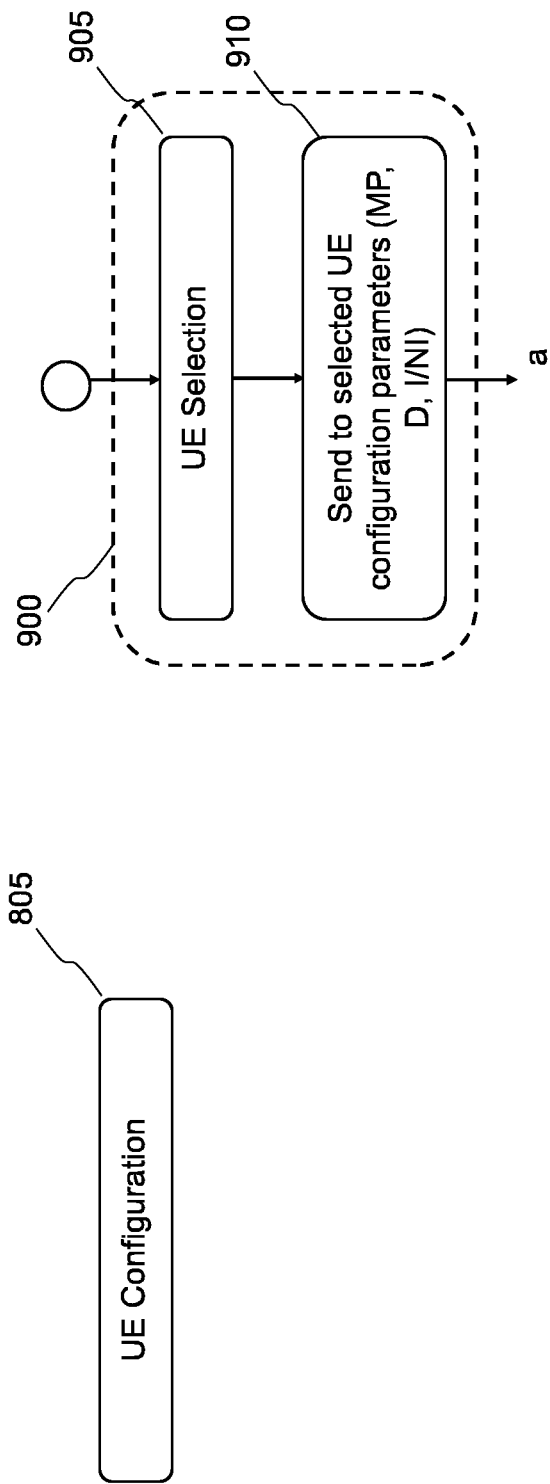
FIG. 9 shows a more detailed flowchart of operations of a step of configuration of UE that will have to perform and provide their position estimates to the Localization Manager.

In greater detail, referring to FIG. 9, in step 805 of the procedure 800 of configuration of the UE (the step 805 is denoted as 900 in FIG. 9), the system 100 selects the UE to be included in a set of UE which will have to calculate and provide to the system 100 their position estimates (step 905). Then (step 910), the Localization Manager 200, in particular the Communication Manager 205, sends to the selected UE configuration parameters to be used by the selected UE to perform and provide the position estimates; such configuration parameters may include: an indication of the measurement time interval MP=[$MP_{start}$, $MP_{stop}$] during which the measurement campaign (to calculate the position estimates) will have to be carried out (e.g.: 24 hours from 00:00 to 24:00 of a specific day, etc.), an indication of the periodicity D with which the UE will have to estimate their position (e.g., every 30 seconds) and an indication (flag I/NI) of whether the UE will have to send their calculated position estimates to the Position Manager 210 immediately after the position estimates have been calculated (flag I/NI set to value I) or the calculated position estimates can be sent by the UE at a later time (flag I/NI set to value NI), preferably before the end of the measurement time interval MP of the measurement campaign.

If the system 100 has to calculate a set 500 of O-D matrices 400n related to an observation time period TP included in the measurement time period MP and such computation has to be carried out in real time, the system 100 configures the UE to immediately transmit their position estimates, as soon as they are calculated (flag N/I set to I).

Differently, in case the system 100 does not need to compute the set 500 of O-D matrices 400*m* in real time, or in case the observation time period TP is not joined to the measurement time period MP, the system 100 may configure the UE for a non-immediate transmission of their position estimates (flag N/I set to NI); this modality allows the UE to transmit two or more triplets 700 altogether, in a same block, or to exploit the establishment of communication links for other services, in both cases making the transmission more efficient, or a UE happening to be in an uncovered area can wait to return to a covered area and then transmit the position estimates.

The selection of the UE to be inserted in the set of UE which will have to calculate and provide to the system 100 their position estimates and to which the configuration parameters have to be sent, can be accomplished in different ways. One possibility is to send the configuration parameters to all the UE which happen to be within the cells 105*b* of the mobile communication network 105 inside the RoI 300, for example exploiting a broadcast message. Another possibility is that the administrator of the system 100, possibly in agreement with the operator of the mobile communication network 105, sends the configuration parameters only to a subset of those UE on the basis of one or more criteria, such as for example:

- UE of users which have given to the network operator their consent to activate their localization;
- UE of users which have given to the network operator or to the administrator of the system 100 their consent to take part to the measurement campaigns to be performed for the specific purposes of the system 100;
- UE of users which, at the subscription of the service contract with the network operator, have declared a residence in a given area (e.g., inside the RoI 300 or inside a specific zone of the RoI 300):
- UE of users in respect of which the network operator has determined a residence or a working location in a certain area (based on any of the known techniques, e.g. the technique described in U.S. Pat. No. 9,706,363, disclosing a method for identifying and locating at least one relevant location visited by at least one individual within a geographical area served by a wireless telecommunication network the method including: identifying and clustering events that occurred within a predefined distance from each other and having a similar probability, computing a weight value for each cluster of events identified, comparing the weight value with a threshold weight value, if the weight value is equal to, or greater than, the threshold weight value, identifying the relevant location as belonging to a selected typology of relevant location, and providing an indication of the position of the at least one relevant location based on recorded position data of the events of the cluster, or if the weight value is lower than the threshold weight value, identifying the relevant location as not belonging to the selected typology of relevant location).

The selection of the UE which will have to calculate and provide to the system 100 their position estimates is preferably made with the aim of complying with law prescriptions (e.g., concerning privacy of users) and/or to avoid unnecessary processing by the UE or the system 100 (for example, avoiding to include in the set of UE those UE which are expected to just quickly transit through the RoI 300, and which, if selected to take part to the measurement campaign, would send position estimates also when they have moved (far) away from the RoI 300). Additionally, the administrator of the system 100, based on the available hardware/software resources (CPU, RAM, etc.) of the system 100, can decide (e.g., to avoid overloading the system 100, particularly the Localization Manager 200 and the Computation Engine 110) to select, among all the possible UE, a suitably small number of UE. The UE can be selected in a random manner or based on specific requirements for the UE, for example based on the localization features and capabilities of the UE, e.g., in terms of achievable accuracy for the position estimate.

Figure 10:
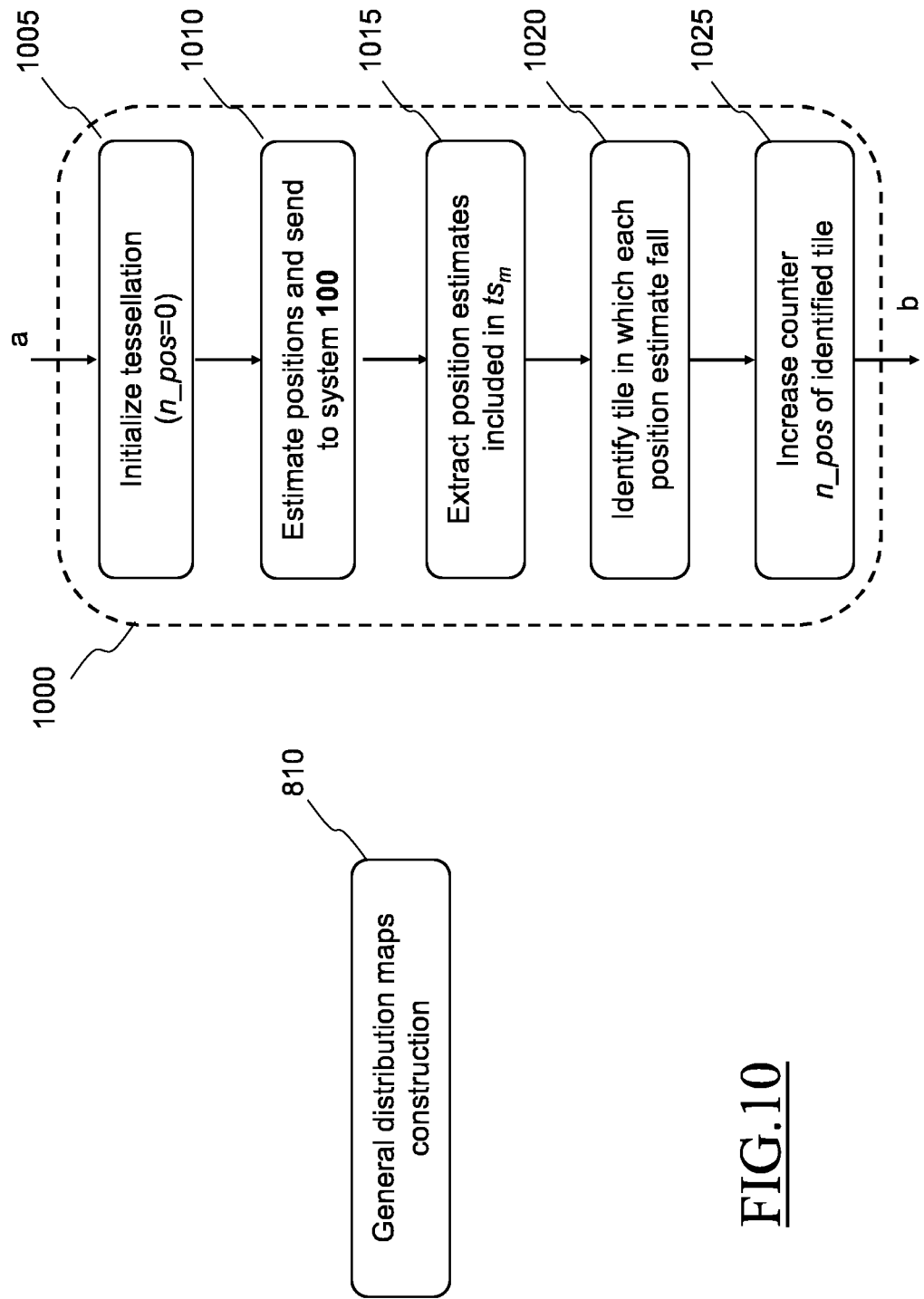
FIG. 10 shows a more detailed flowchart of operations of a step of construction of general distribution maps.

Referring to FIG. 10, the step 810 (denoted as 1000 in FIG. 10) of construction of the general distribution maps (one general distribution map for each time slot $ts_m$) may comprise the following operations.

For each general distribution map to be constructed and for each tile 605 of the tessellation 600 in respect of each general distribution map, a counter n_pos is initialized to an initial value, e.g. to 0 (zero); the counter n_pos will be used to count the number of position estimates received by the UE (of the selected set of UE) falling in said tile in the considered time slot $ts_m$ (step 1005).

Then, starting from the time instant $MP_{start}$ and till the time instant $MP_{stop}$ of the measurement time period MP during which the measurement campaign is carried out, the UE selected at step 905 estimate their own geographic position every D seconds and send the calculated position estimates (in accordance to the timing specified by the setting of the flag I/NI) to the Position Manager 210, e.g. in the form of triplets 700 as depicted in FIG. 7; the Position Manager 210 stores the received triplets 700 in the Position Repository 215 (step 1010).

For each time slot $ts_m$, at the end of the same, or, alternatively, at the end of the measurement time period MP, the Position Manager 210 extracts from the Position Repository 215 all the received triplets 700 having a value in the respective field timestamp 715 included in the time slot $ts_m$ under consideration and sends the extracted triplets to the Computation Engine 110 (step 1015). In case the observation time period TP is included in the measurement time period MP and the system 100 has to process the data and create the set 500 of O-D matrices 400*m* in real time, the operation 1015 should start as soon as the timeslot $ts_m$ ends; otherwise the operation can be started after the end of the measurement time period MP.

The Computation Engine 110 receives from the Position Manager 210 the extracted triplets 700 and, for each received triplet, based on the geographic coordinates included in the field position (x,y) 710 thereof, it determines in which tile 605 of the tessellation 600 the considered triplet falls (step 1020). The Computation Engine 110 increases of a predetermined amount (e.g., 1) the counter n_pos corresponding to the determined tile 605 (step 1025). In the case that the geographic coordinates present in the field position (x,y) 710 of a triplet 700 under consideration are internal to the determined tile 605 there is a univocal assignment of the position of the corresponding UE to that tile (and the counter n_pos of that tile is increased of the predetermined amount); when instead the coordinates present in the field position (x,y) 710 of the triplet 700 are located on the boundary between two or more tiles 605 of the tessellation 600, there are two possibilities: 1) a first possibility is to randomly select one of the two or more concerned tiles and to increase of the predetermined amount (e.g., 1) the counter n_pos corresponding to the randomly selected tile 605; 2) another possibility is to increase the counters n_pos associated to all the two or more concerned tiles 605 of the predetermined amount (e.g., 1) divided by the number of concerned tiles 605. The choice between one or the other of these two possibilities can for example be made by the administrator of the system 100, through the Administrator Interface 120.

Once all the triplets 700 relating to the time slot $ts_m$ have been analysed by the Computation Engine 110, the general distribution map is obtained that, for the considered time slot $ts_m$, associates, with each tile 605 of the tessellation 600, a value of the respective counter n_pos equal to the number of position estimates which have been received from the (selected) UE and which have geographic coordinates in the field position (x,y) 710 falling in said tile 605.

Figure 11:
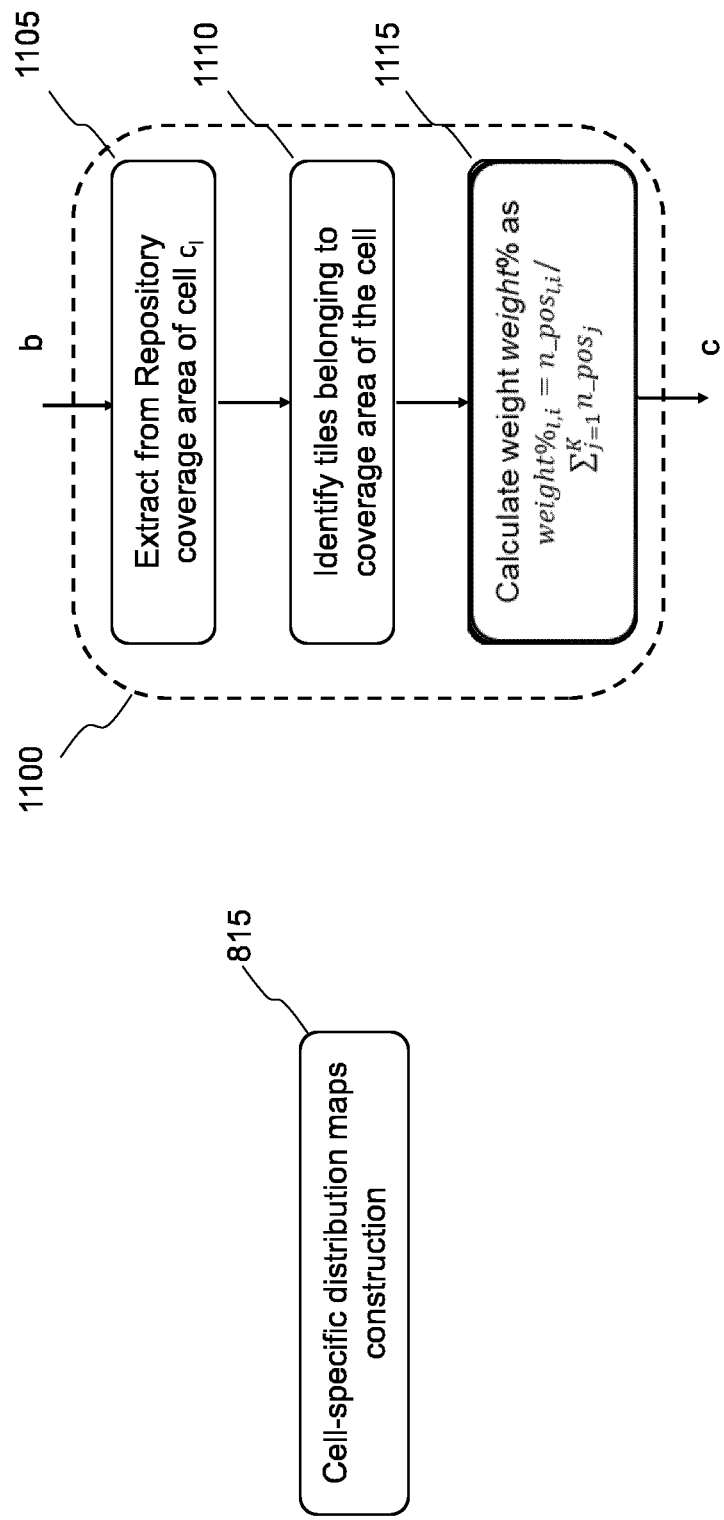
FIG. 11 shows a more detailed flowchart of operations of a step of construction of cell-specific distribution maps.

Then, the step 815 of construction of the cell-specific distribution maps for each time slot $ts_m$ starts. This step is schematically depicted in the flowchart of FIG. 11 where it is denoted 1100.

For each network cell $c_1$ of the mobile communication network 105 the Computation Engine 110 extracts from the Repository 115 the corresponding coverage area (step 1105) and determines all the K tiles 605 of the tessellation 600 that belong to the coverage area of the cell $c_1$ (step 1110). One way to determine that a tile 605 belongs to the coverage area of the cell $c_1$ is by assessing that the coordinates of the center of gravity of the tile 605 fall inside the coverage area of the cell $c_1$, or that a given percentage (fraction) of the tile surface, for example a predetermined % value, falls inside the coverage area of the cell $c_1$. The choice of the specific criterion/criteria for considering that a tile 605 belongs to the coverage area of the cell $c_1$ is for example made by the administrator of the system 100 through the Administrator Interface 120.

For each one of the K tiles determined at step 1110, the Computation Engine 110 calculates a weight value weight % as the ratio between the numerical value of the counter n_pos for that tile 605 and the sum of the numerical values of the counters n_pos for all the K tiles:

$$\text{weight } \%_{l,i} = n\_pos_{l,i} / \Sigma_{j=1}^{K} n\_pos_j \quad \text{(Equation 1)}$$

with the index i=K (step 1115). The result of this operation is, for each time slot $ts_m$, the cell-specific distribution map for the cell $c_1$, which establishes a correspondence between each tile 605 of the tessellation 600 and a respective weight value calculated as in Equation 1. Such a weight value can be regarded as the probability that a user of a UE that is located in the coverage area of the cell $c_1$ is, in the generic time slot $ts_m$, specifically located in the i-th tile 605 of the tessellation 600. By repeating these operations for all the cells of the mobile communication network 105 a set of cell-specific distribution maps is obtained for every time slot $ts_m$, one for every cell.

When the observation time period MP lasts 24 hours or, more generally, few days (the duration of the observation time period MP may depend on how often the mobile communication network operator modifies the coverage of the network) the system 100 can be configured by the system administrator in such a way that the operations 1105 and 1110 are performed only once, at the time the triplets 700 of the first time slot $ts_1$ of the measurement time period MP are processed. The tiles 605 identified at that time are used, without changes, also during the processing performed for the other time slots from $ts_2$ to $ts_M$.

Figure 12:
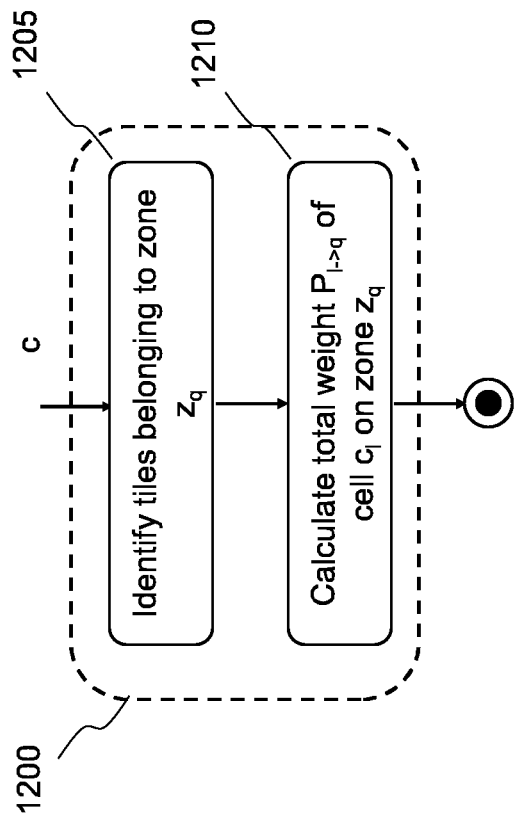
FIG. 12 shows a more detailed flowchart of operations of a step of construction of cells-zones correspondence maps.
Figure 12:
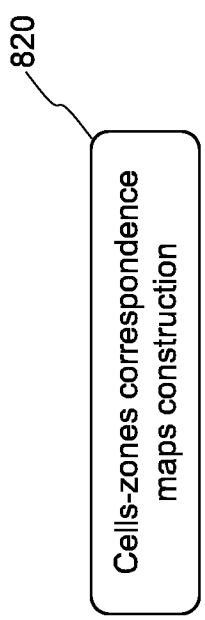

At this point, the step 820 of constructions of cells-zones correspondence maps (one for each time slot $ts_m$) commences, as schematized by the procedure 1200 in the flowchart of FIG. 12.

For each zone $z_q$ of the subdivision in zones of the RoI 300 the K' tiles 605 of the tessellation 600 that belongs to the considered zone $z_q$ are identified (step 1205). One way to determine that a tile 605 belongs to the zone $z_q$ is by assessing that the coordinates of the center of gravity of the tile 605 fall inside the zone $z_q$, or that a given percentage (fraction) of the tile surface, for example a predetermined % value, falls inside the zone $z_q$. The choice of the specific criterion/criteria for considering that a tile 605 belongs to the zone $z_q$ is for example made by the administrator of the system 100 through the Administrator Interface 120. For simplifying the configuration and the management of the system 100, the specific criteria adopted (coordinates of the center of gravity of the tile 605 inside the zone $z_q$, a given percentage of the tile 605 inside the zone $z_q$ or any other possible criterion) may be the same adopted in step 1110 for identifying the K tiles belonging to the coverage area of each cell of the mobile communication network 105.

In addition, step 1205, similarly to step 1110, can be performed just once, at the time of processing of the position estimates of the first time slot $ts_1$ of the measurement time period MP.

Then, for each time slot $ts_m$ and for each cell $c_1$ of the mobile communication network 105, by exploiting the cell-specific distribution map for that cell, calculated in the preceding step 815 and referring to the time slot $ts_m$ (steps 1105-1115), the weight $(P_{l \to q})_m$ of the cell $c_1$ on the zone $z_q$ is calculated by summing up the weights of the K' tiles identified at step 1205 and obtained from the map (step 1210), i.e.:

$$(P_{l \to q})_m = \Sigma_{i=1}^{K'} (\text{weight } \%_{l,i})_m \quad \text{(Equation 2)}.$$

Such weight $(P_{l \to q})_m$ can be regarded as the probability that a user of a UE that is located in the coverage area of the cell $c_1$ is, in the time slot $ts_m$, located in the specific zone $z_q$ among all the zones of the partition in zones of the RoI 300.

By repeating this operation in every time slot $ts_m$ and for all the cells $c_1$ of the mobile communication network 105, the cells-zones correspondence map is obtained, which is the map in which every zone $z_q$ of the subdivision in zones of the RoI 300 is associated with the total weight of each cell $c_1$ of the mobile communication network 105 on such a zone in the time slot $ts_m$.

The cells-zones correspondence maps, relating to the time slot $ts_m$ of the measurement time period MP, are exploited for calculating, in the corresponding time slot $ts_m$ of the observation time period TP, the zones of origin and destination of movements of UE users to be inserted in the O-D matrices to be computed. The operations of computation of the set 500 of O-D matrices 400m are schematized as 1300 in the flowchart of FIG. 13 and are described herebelow.

Firstly, the Computation Engine 110 retrieves from the Repository 115 event records $er_v$ stored therein. The Computation Engine 110 may retrieve at a time one group $erg_n$ of event records $er_v$ generated by a same UE (step 1305).

To this purpose, the Computation Engine 110 may initialize a UE index variable n (e.g., n=0, ..., N, N≥0) and then retrieve, e.g. sequentially, from the Repository 115 a corresponding n-th event records group $erg_n$ stored therein, related to the n-th UE.

Then, the system 100 may check if the retrieved event records group $erg_n$ and the event records contained therein satisfy data quality requirements before processing them (step 1310). The data quality requirements are designed for ensuring reliability and accuracy in the results provided by the system 100 obtained through computation involving probability and statistic computation.

As a non-limitative example, data quality requirements to be fulfilled may comprise one or more of the following:

a total number of events $e_v$, within the observation time period TP, associated with the event records group $erg_n$ is at least equal to, or greater than, a total number of events threshold;

an average number of daily events $e_v$, within the observation time period TP, associated with the event records group $erg_n$ is at least equal to, or greater than, a predetermined average number of events threshold, and/or a number of daily (or a different subinterval) events $e_v$ associated with the event records group $erg_n$ is at least equal to, or greater than, a daily (or a different subinterval) number of events threshold.

The data quality requirements may be set by the administrator of the system 100 through the Administrator Interface 120—even though alternative embodiments in which the data quality requirements may be at least partly set by the user of the system 100 through the User Interface 125 are not excluded.

In case the event records group $erg_n$ does not satisfy quality requirements, the event records group $erg_n$ is discarded and a next event records group $erg_{n+1}$ (associated with another UE) is processed (unless the n-th user was already the last user having event records in the Repository 115).

The system 100 may also perform a selection among the retrieved event records group $erg_n$ in respect of the considered n-th UE. The selection made by the system 100 may for example be in accordance with the teachings of WO 2018/121842 A1, adapted to determine a mobility status of the considered UE, wherein the UE is in a motion or in a stay status. As disclosed in WO 2018/121842 A1 (to be intended as incorporated herein by reference), the determination of the mobility status can be done by determining, for each event of interaction, a served area of the mobile communication network pertaining to that UE at the occurrence of that event of interaction, and determining the mobility status of that UE at the occurrence of that event of interaction according to at least one among: a comparison between a distance between the served area and a first further served area of the mobile communication network pertaining to that UE at the occurrence of a first further event of interaction occurring before said event of interaction, and a first threshold distance depending on the served area and on the first further served area; a comparison between a distance between the served area and a second further served area of the mobile communication network pertaining to that UE at the occurrence of a second further event of interaction occurring after said event of interaction, and a second threshold distance depending on the served area and on the second further served area.

Other criteria for selecting the events records among those retrieved from the repository can be implemented, alternative or in addition to the above ones. For example, a simple decimation of the events records can be implemented, for reducing the number of events records to be processed.

In this way, selected events records are obtained.

Then, for each pair of selected event records $er_k$ and $er_{k+1}$ belonging to the event records group $erg_n$ under consideration and consecutive in time, related to two consecutive timestamps $t_k$ e $t_{k+1}$ within the observation time period TP, the two network cells $c_k$ and $c_{k+1}$ (as indicated by the cell identifiers contained in the event records $er_k$ and $er_{k+1}$) identify a movement of the UE user that origins in cell $c_k$ (origin cell) and ends in cell $c_{k+1}$ (destination cell). The two cells $c_k$ and $c_{k+1}$ (origin cell and destination cell) have to be associated to the zones $z_q$ of the partition in zones of the RoI 300, and the two timestamps $t_k$ e $t_{k+1}$ have to be associated to time slots of the observation time period TP.

From the knowledge of the origin cell $c_k$ (as indicated by the cell identifier contained in the event record $er_k$), exploiting the respective cells-zones correspondence map related to the time slot $ts_k$, in which the timestamp $t_k$ (of the event record $er_k$) falls, a zones set $ORIG_k=\{z_o\}_k$ is built, which is comprised of the K' zones $z_q$ of the partition in zones of the RoI 300 such that the weight $(P_{k \to o})_k$ of the cell $c_k$ on each zone of the set $ORIG_k=\{z_o\}_k$ is different from 0 (more generally, the cell $c_k$ has a weight greater than a predetermined cell weight value and this predetermined cell weight value is preferably set by the administrator of the system 100 through the Administrator Interface 120) (step 1315). In other words, the set $ORIG_k=\{z_o\}_k$ includes the (K') zones for which the probability that the considered UE is located, in the time slot $ts_k$, in such zones is not zero (or not lower than a predetermined probability).

Similarly, from the knowledge of the destination cell $c_{k+1}$ (as indicated by the cell identifier contained in the event record $er_{k+1}$), exploiting the respective cells-zones correspondence map related to the time slot $ts_{k+1}$, in which the timestamp $t_{k+1}$ falls, a zones set $DEST_{k+1}=\{z_d\}_{k+1}$ is built, which is comprised of the K'' zones $z_q$ of the partition in zones of the RoI 300 such that the weight $(P_{k+1 \to d})_{k+1}$ of the cell $c_{k+1}$ on each zone of the set $DEST_{k+1}=\{z_d\}_{k+1}$ is different from 0 (more generally, the cell has a weight greater than a predetermined cell weight value and this predetermined cell weight value is preferably set by the administrator of the system 100 through the Administrator Interface 120) (step 1320). In other words, the set $DEST_{k+1}=\{z_d\}_{k+1}$ includes the (K'') zones for which the probability that the considered UE is located, in the time slot $ts_{k+1}$, in such zones is not zero (or not lower than a predetermined probability).

Each zone $z_q$ of the zones set $ORIG_k$ is the origin of a movement of the UE user towards each zone $z_d$ of the zones set $DEST_{k+1}$ so that, overall, between all the zones of the set $ORIG_k$ and all the zones of the set $DEST_{k+1}$ there will be a number of K'*K'' of movements. A respective movement weight is assigned to each of such movements, the movement weight being calculated as a function of the weights $(P_{k \to o})_k$ and $(P_{k+1 \to d})_{k+1}$, for example the function being the product of the weights (step 1325):

$$(P_{od})_{k,k+1} = (P_{k \to o})_k * (P_{k+1 \to d})_{k+1} \quad \text{(Equation 3)}.$$

$(P_{od})_{k,k+1}$ is a joint probability, obtained as the product of two probabilities $(P_{k \to o})_k$ and $(P_{k+1 \to d})_{k+1}$, assuming a statistical independency of the latter, determined by the origin and destination events corresponding to the event records $er_k$ and $er_{k+1}$.

It is pointed out that in case the two cells $c_k$ and $c_{k+1}$ (origin cell and destination cell) coincide (i.e., the UE user has not moved from the cell where it is), the two sets $ORIG_k=\{z_o\}_k$ and $DEST_{k+1}=\{z_d\}_{k+1}$ coincide and when the number of K'*K'' of movements is calculated, some of these movements will have a same zone $z_q$ both as origin and as destination. The contribution of these "movements" (actually, "non-movements") appears in the diagonal of the O-D matrix to be calculated or it may be not included in the O-D matrix.

The time slot, and thus the O-D matrix 400*m* of the set 500 of O-D matrices to which the K'*K'' of movements are assigned, is determined as described in the following.

If both the event times $t_k$ and $t_{k+1}$ belong to a same time slot $ts_m$ of the observation time period TP, each one of the K'*K'' movements from the origin zone $z_q$ to the destination zone $z_d$ determines an increase in the entry mod(o,d) of the O-D matrix 400*m* of the set 500 of O-D matrices associated with the time slot $ts_m$, the increase being for example of an amount equal or corresponding to $(P_{od})_{k,k+1}$ (calculated according to Equation 3), i.e., all the movements are associated with the O-D matrix 400*m*.

If instead the event times $t_k$ and $t_{k+1}$ belong to different time slots $ts_m$ and $ts_{m+1}$, substantially three possible options are available for assigning values to the entries mod(i,j) in computing the O-D matrices 400*m*:

1. each one of the K'*K" movements from the origin zone $z_o$ to the destination zone $z_d$ determines an increase of the respective entries mod(o,d) of the O-D matrix 400*m* of the set 500 of O-D matrices associated with the time slot $ts_m$, said increase being for example of an amount equal or corresponding to $(P_{od})_{k,k+1}$ (calculated as in Equation 3), i.e. all the movements are associated with the O-D matrix 400*m* corresponding to the time slot $ts_m$, in which the event timestamp $t_k$ (of the event record $er_k$) falls;
2. each one of the K'*K" movements from the origin zone $z_o$ to the destination zone $z_d$ determines an increase of the respective entries mod(o,d) of the O-D matrix 400*m*+1 of the set 500 of O-D matrices associated with the time slot $ts_{m+1}$ said increase being of an amount equal or corresponding to $(P_{od})_{k,k+1}$ (calculated as in Equation 3), i.e. all the movements are associated with the O-D matrix 400*m*+1 corresponding to the time slot $ts_{m+1}$, in which the event timestamp $t_{k+1}$ (of the event record $er_{k+1}$) falls; or
3. each one of the K'*K", with the respective weight $(P_{od})_{k,k+1}$ (calculated as in Equation 3) may be distributed between each one of the O-D matrices 400*m*÷400*m*+x of the set 500 associated with each one of the time slots $ts_m \div ts_{m+x}$ (where x≥1) comprising at least partially a movement time interval $[t_k, t_{k+1}]$ defined by the event times $t_k$ and $t_{k+1}$. (i.e., the event time $t_k$ occurring during the time slot $ts_m$ and the event time $t_{k+1}$ occurring during the time slot $ts_{m+x}$). The K'*K" movements can be associated in a proportional manner to each one of the time slots $ts_m \div ts_{m+x}$, and consequently assigned with the respective weight $(P_{od})_{k,k+1}$ to the corresponding matrices 400*m*÷400*m*+x, according to a (time) portion of the movement time interval $[t_k, t_{k+1}]$ taking place during each one of the time slots $ts_m \div ts_{m+x}$.

For example, by considering two consecutive time slots $ts_m$ and $ts_{m+1}$ comprising the movement time interval $[t_k, t_{k+1}]$, a first (time) portion of the movement time interval $[t_k, t_{k+1}]$, e.g. a first fraction, let it be said 60%, of the movement time interval $[t_k, t_{k+1}]$, falls in the time slot $ts_m$ while a second (time) portion of the movement time interval $[t_k, t_{k+1}]$, e.g. the remaining second fraction, in the example 40%, of the movement time interval $[t_k, t_{k+1}]$, falls in the other time slot $ts_{m+1}$, all the K'*K" entries mod(o,d) of the O-D matrix 400*m* are increased by $0.6*(P_{od})_{k,k+1}$, (i.e., by an amount equal or corresponding to the first fraction of the movement time interval $[t_k, t_{k+1}]$) while all the K'*K" entries mod(o,d) of the other O-D matrix 400*m*+1 are increased by $0.4*(P_{od})_{k,k+1}$ (i.e. by an amount equal or corresponding to the second fraction of the movement time interval $[t_k, t_{k+1}]$).

The first option privileges the initial time ($t_k$) at which a movement is started, the second option privileges instead the final time ($t_{k+1}$) of the movement, while the third option considers the duration of the movement time interval.

Preferably, the administrator of the system 100 through the Administrator Interface 120 and/or the user of the system 100 through the User Interface 125 may choose among the three options according to their needs.

Figure 13:
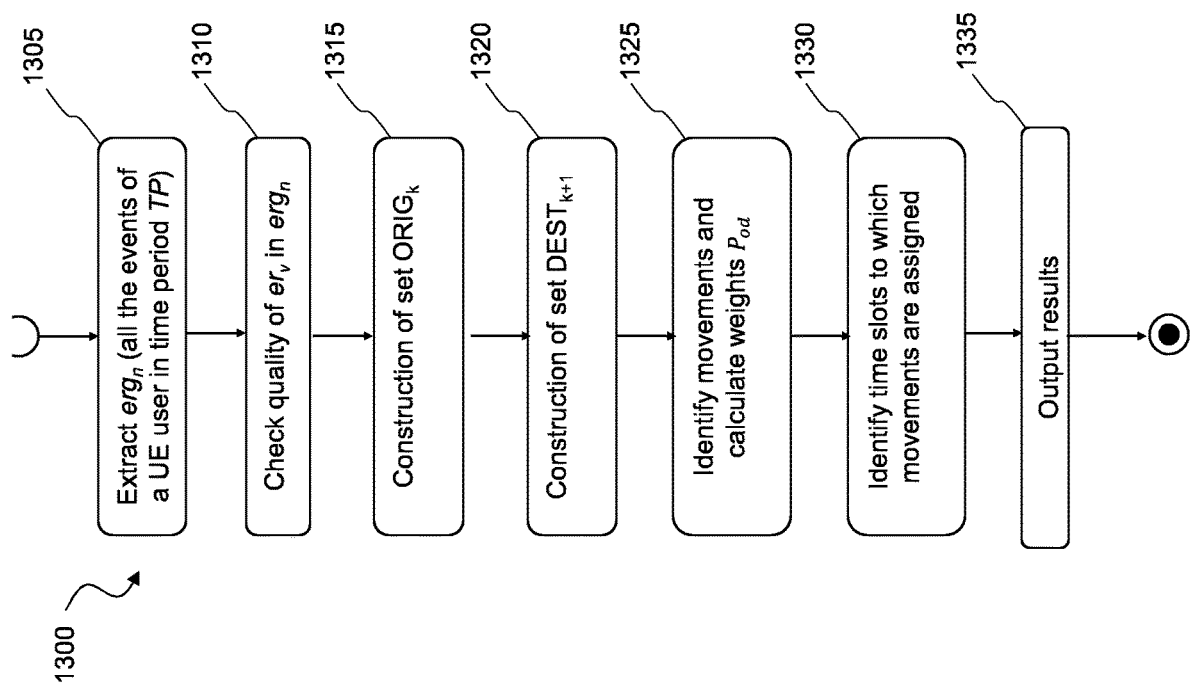
FIG. 13 shows a more detailed flowchart of operations for the computation of O-D matrices on the RoI and for the construction of a set of O-D matrices.

Operations from 1310 to 1330 of the flowchart of FIG. 13 are repeated for all the UE in respect of which an event records group $erg_n$ is stored in the Repository 115 (progressively increasing the UE index variable n).

When all the UE have been analysed (UE index variable n=N), the system 100 provides in output the calculated set 500 of O-D matrices 400*m* to the user of the system 100, through the User Interface 125.

After such provision of the computation results the operation of the system 100 is concluded.

In other embodiments, the solution according to the present disclosure may comprise methods featuring different steps or some steps may be performed in a different order or in parallel.

If the system 100 is exploited for calculating the O-D matrices in two or more RoIs 300 at a time, during operation at step 1015 the Position Manager 210 can look and take into consideration, in addition to the field timestamp 715 of the triplet 700 containing the position estimate, also the identifier, contained in the field UE_id 705 of the triplet, of the UE that calculated the position estimate (if the field UE_id 705 is present) and retrieve from the Position Repository 215 only the position estimates coming from those UE that, with the operation at step 905, have been identified to be in a certain one of the RoIs 300.

If, while performing the operations at step 1015 for the time slot $ts_m$ under analysis, it is determined that no useful triplets 700 are stored in the Position Repository 215, or the available triplets 700 are in a number less than a minimum threshold number, the Position Manager 210 may extract from the Position Repository 215 also the triplets 700 included in the immediately adjacent (preceding and successive) time slots, until the overall number of extracted position estimates reaches the threshold number. All these triplets are then sent to the Computation Engine 110 for being processed, as if such triplets 700 were all internal to the time slot $ts_m$ under consideration. This option and the minimum threshold number can be decided and configured by the administrator of the system 100 through the Administration Interface 120.

In order to reduce the processing time of the system 100 or to reduce the need of communication bandwidth for the communication between the Position Manager 210 and the Computation Engine 110 when the two modules are physically separated from each other, the administrator of the system 100 can decide to reduce the number of, e.g. to decimate, the position estimates 700 to be processed by the Position Manager 210 before the transmission to the Computation Engine 110 (operation at step 1015), or to be processed by the Computation Engine 110 before starting the processing (operations at step 1020). In this way, just one triplet 700 (i.e., just one position estimate) is taken out of a number n of triplets 700 (i.e., n position estimates). Such a reduction in number of the position estimates to be subject to processing can be operated on a per-user (per-UE) basis, in case the field UE_id 705 is present in the triplets 700 (this means that one measurement is retained for each value of the field UE_id), or globally on all the position estimates (this means that one measurement is retained every n measurements, irrespective of the UE—identified by the value in the field UE_id—that performed the measurements).

For similar reasons, the Position Manager 210 or the Computation Engine 110 can be configured by the administrator of the system 100 (through the Administrator Interface 120) to calculate, from the set of position estimates extracted during the operations at step 1015, an average position for each UE, if the field UE_id 705 is present, and to exploit this single average position in the operations at step 1020. Also this option can be decided by the administrator of the system 100.

The set of measurements (position estimates) performed during a measurement campaign MP can be exploited without changes for calculating the set 500 of O-D matrices 400m related to more than one observation time periods TP. In other words, when a user of the system 100 requests to the system 100 the calculation of the set 500 of O-D matrices 400m on a certain time period TP, before starting a measurement campaign on a certain time period MP, the user may ascertain if in the system 100, particularly in the Position Repository 215, there are already stored triplets 700 obtained in a preceding time period MP on the RoI 300 of interest for the user, and decide to exploit the already available triplets 700 on the subdivision in zones of the RoI of that user. In this case, the system 100 starts directly with the operations at step 1015. Even more, if the tessellation and/or the subdivision in zones of the RoI of interest for that user of the system 100 are the same to that/those used previously, the user of the system 100 may decide to reuse the general distribution maps and the cells-zones correspondence maps already calculated previously. The processing burden for calculating the new set 500 of O-D matrices 400m is consequently reduced.

The solution according to the present disclosure is independent from the specific localization technique employed by the UE for estimating their positions: it is for example possible to employ a technique based on mobile radio technology, standard or not (Cell-Id, TOA, based on radio signal strength measurements, etc.), or a technique based on short-range communication capabilities of the UE (e.g., Wi-Fi, Bluetooth, etc.) or a satellite-localization technique (GPS, Galileo, etc.).

In an embodiment of the present disclosure, the UE can send, within the triplets 700, particularly within the field position (x,y) 710 of the triplets 700, also an indication of the uncertainty, or of the accuracy, associated with the estimated position. The Computation Engine 110, when performing the operations at step 1020, can decide to use only those position estimates that are accompanied by a value of uncertainty lower than a predefined uncertainty threshold, for example set by the administrator of the system 100 through the Administrator Interface 120. The uncertainty threshold can depend on the characteristic size of the generic tile 605 of the tessellation 600 (for example, in case of square tiles 605, the uncertainty threshold can be set equal to half the length of the tile side; for circular tiles, the uncertainty threshold can be set equal to the radius of the circumference delimiting the tile).

In an embodiment of the present disclosure, the operations at step 810 can be cooperatively carried out also with the participation of those UE that are not capable of estimating their position (either because they do not have installed a suitable software or because the software available to them always provided results affected by an a-priori unacceptable uncertainty). These can be UE that are only capable of measuring the characteristics of the radio signal received from the radio base stations 105a (e.g., serving radio base station, received radio signal power, adjacent radio base stations, etc.). The Position Manager 210, upon receiving these measurements, can calculate the position of the UE exploiting a localization algorithm and store the results in the Position Repository 215 (step 1010).

The system 100 can be implemented by means of an app/server architecture, which provides for having an app installed on the UE which dialogues with a remote server using, at high level, Internet protocols and, at a lower level, the User-plane of the mobile communication network 105. Alternatively, the solution according to the present disclosure can be actuated exploiting, at least in part, messages and functions of the MDT (Minimization of Drive Tests) technology, introduced in the Release 10 of the 3GPP standard for UMTS and LTE (see e.g. the 3GPP TS 37.320). For example, in case of immediate transmission (flag I/NI set to I) of the position estimates, it is possible to exploit the functionality called "Immediate MDT", whereas in case of delayed transmission (flag I/NI set to NI) it is possible to exploit the functionality called "Logged MDT".

The invention claimed is:

1. A method, implemented by a data processing system, for computing Origin-Destination matrices indicative of movements, in a geographic area of interest, of physical entities being users of mobile communication terminals configured to be adapted to interact with a mobile communication network comprising a plurality of network cells covering said geographic area of interest, each Origin-Destination matrix being related to a respective time slot of an observation time period and comprising a plurality of entries, the method comprising:
    subdividing said geographic area of interest in a plurality of geographic zones, each entry of an Origin-Destination matrix to be computed containing an indication of a number of movements from one geographic zone to another geographic zone of said plurality of geographic zones in said respective time slot;
    subdividing the geographic area of interest in a plurality of geographic area portions;
    causing mobile communication terminals served by the mobile communication network and situated in the geographic area of interest to calculate respective geographic position estimates and provide the calculated geographic position estimates to the data processing system;
        distributing an overall number of geographic position estimates, received from the mobile communication terminals, on said geographic area portions by assigning to each geographic area portion of said plurality of geographic area portions a respective number of geographic position estimates corresponding to geographic positions estimates falling within said geographic area portion;
    for each of said plurality of network cells: determining, among said plurality of geographic area portions, covered geographic area portions falling within a coverage area of said network cell, and assigning to each one of the determined covered geographic area portions a respective weight which depends on said respective number of geographic position estimates compared to an overall number of geographic position estimates falling within all said determined covered geographic area portions;
    generating a correspondence map establishing a correspondence between said network cells and said geographic zones, said generating the correspondence map comprising, for the considered network cell, calculating a cell weight of the network cell on each geographic zone of said plurality of geographic zones by determining the covered geographic area portions belonging to each of said zones and summing the respective weights of the covered geographic area portions identified as belonging to said each of said geographic zones;

receiving from the mobile communication network and storing in a repository indications of events of interaction between the mobile communication terminals and the network cells of the mobile communication network, each indication of events of interaction including an indication of the network cell in which the event of interaction occurred and a time indication of the occurred event of interaction;

for each of said mobile communication terminals:
extracting from the repository and analysing the respective indications of events of interaction stored in the repository;
for selected couples of indications of events of interactions consecutive in time, extracted from the repository
identifying the respective network cells in which the two events of interaction occurred, wherein the network cell in which the first in time event of interaction of the said couple of indications of events of interactions occurred is considered as origin network cell of a movement and the network cell in which the second in time event of interaction of said couple of indications of events of interactions is considered as destination network cell of a movement, wherein said identifying the respective network cells is based on said indication of the network cell in which the event of interaction occurred included in the indication of events of interaction stored in the repository;
identifying as origin geographic zones of said plurality of geographic zones where the mobile communication terminal was located when the first in time event of interaction of the couple occurred those geographic zones in respect of which the cell weight of the network cell associated with the first in time event of interaction of said couple is greater than a predetermined minimum weight;
identifying as destination geographic zones of said plurality of geographic zones where the mobile communication terminal was located when the second in time event of interaction of the couple occurred those geographic zones in respect of which the cell weight of the network cell associated with the second in time event of interaction of said couple is greater than a predetermined minimum weight,
assigning to each movement from one of the identified origin geographic zones to one of the identified destination geographic zones a respective movement weight calculated as a function of the weight of the origin network cell on said origin geographic zone and of the weight of the destination network cell on said destination geographic zone;
assigning to the entry of the Origin-Destination matrix corresponding to said one of the origin geographic zones and said one of the destination geographic zones a value determined on the basis of said movement weight, and
providing said Origin-Destination matrices in output from said data processing system for the use, by a user of the data processing system, for estimating movements, in a geographic area of interest, of physical entities.

2. The method of claim 1, wherein said indications of events of interaction between the mobile communication terminals and the network cells of the mobile communication network includes indications about one or more among:

interactions at the power-on and/or power-off of the mobile communication terminals;
interactions at location area updates;
interactions at the re-entrance of the mobile communication terminals into an area covered by the mobile communication network from an area not covered by the mobile communication network;
interactions at the switch of the mobile communication terminal from a mobile network technology to another;
interactions at incoming/outgoing phone calls;
interactions at sending/receiving SMS and/or MMS;
interactions at Internet access.

3. The method of claim 1, wherein said causing mobile communication terminals served by the mobile communication network and situated in the geographic area of interest to calculate respective geographic position estimates and provide the calculated geographic position estimates to the data processing system comprises selecting, among all the mobile communication terminals served by the mobile communication network and situated in the geographic area of interest, a subset of selected mobile communication terminals according to a selection criterion comprising at least one among:

mobile communication terminals of users which have given their consent to activate their geographic localization;
mobile communication terminals of users which have given their consent to take part to measurement campaigns to be performed for purpose of calculating presences of individuals on a geographic territory;
mobile communication terminals of users who, at subscription, have declared a residence in a certain area inside the geographic area of interest;
mobile communication terminals of users in respect of whom the operator of the mobile communication network has determined a residence or a working location in a certain area inside the geographic area of interest.

4. The method of claim 3, comprising configuring the subset of selected mobile communication terminals, said configuring comprising providing to the selected mobile communication terminals at least one among:

an indication of a time interval during which the selected mobile communication terminals will have to calculate the respective geographic position estimates;
an indication of a periodicity with which the selected mobile communication terminals will have to calculate the respective geographic position estimates;
an indication of whether the selected mobile communication terminals will have to provide to the data processing system the respective calculated geographic position estimates immediately after the respective geographic position estimates have been calculated or the respective calculated geographic position estimates can be provided to the data processing system at a later time after they have been calculated.

5. The method of claim 1, wherein determining covered geographic area portions of said plurality of geographic area portions falling within a coverage area of said network cell comprises:

obtaining a coverage area of said network cell;
determining which of said plurality of geographic area portions belong to the coverage area of said network cell, wherein said determining comprises at least one among:

assessing which of said plurality of geographic area portions have geographic coordinates of a center of gravity thereof falling inside the coverage area of said network cell;

assessing which of said plurality of geographic area portions fall, for a given percentage of their area, inside the coverage area of the network cell.

6. The method of claim 1, wherein said determining the covered geographic area portions belonging to each of said zones comprises one among:

assessing which of said geographic area portions have geographic coordinates of a center of gravity thereof falling inside the zone;

assessing which of said geographic area portions fall, for a given percentage of their area, inside the zone.

7. The method of claim 1, wherein said distributing an overall number of geographic position estimates received from the mobile communication terminals on said geographic area portions and said generating a correspondence map are performed for each time slot of said observation time period, whereby said cell weight of the network cell provides an indication of a probability that a user of a mobile communication terminal that is located in the coverage area of the network cell is, in the considered time slot, located in a specific zone of said plurality of zones.

8. A data processing system comprising modules configured to perform, when operated, the method of claim 1.

* * * * *